US012214588B2

(12) United States Patent
Landa et al.

(10) Patent No.: US 12,214,588 B2
(45) Date of Patent: Feb. 4, 2025

(54) DRYING INK IN DIGITAL PRINTING USING INFRARED RADIATION

(71) Applicant: Landa Corporation Ltd., Rehovot (IL)

(72) Inventors: Benzion Landa, Nes Ziona (IL); Alon Siman Tov, Or Yehuda (IL); Avraham Guttman, Yavne (IL); Yefet Nechemia, Givat Koach (IL); Amir Shmerling, Ramat Gan (IL)

(73) Assignee: Landa Corporation Ltd., Rehovot (IL)

( * ) Notice: Subject to any disclaimer, the term of this patent is extended or adjusted under 35 U.S.C. 154(b) by 0 days.

(21) Appl. No.: 18/482,918

(22) Filed: Oct. 9, 2023

(65) Prior Publication Data

US 2024/0083164 A1 Mar. 14, 2024

Related U.S. Application Data

(63) Continuation of application No. 17/773,609, filed as application No. PCT/IB2020/060552 on Nov. 10, 2020, now Pat. No. 11,833,813.

(Continued)

(51) Int. Cl.

*B41J 2/005* (2006.01)
*B41J 11/00* (2006.01)
*B41M 5/025* (2006.01)

(52) U.S. Cl.

CPC ....... *B41J 2/0057* (2013.01); *B41J 11/00216* (2021.01); *B41M 5/0256* (2013.01)

(58) Field of Classification Search

CPC ....... B41F 16/00; B41F 1/18; B41J 11/00216; B41J 2/00214; B41J 2/0021; B41J 2/0057;

(Continued)

(56) References Cited

U.S. PATENT DOCUMENTS 6,550,905 B1 * 4/2003 Deckers ............... C09D 11/101 347/100
6,646,278 B1 * 11/2003 Schwarz ................ B05D 3/067 250/504 R (Continued)

FOREIGN PATENT DOCUMENTS

JP 2002307815 A 10/2002
JP 2004126380 A 4/2004

(Continued)

OTHER PUBLICATIONS

Co-pending U.S. Appl. No. 18/390,898, filed Dec. 20, 2023.

(Continued)

*Primary Examiner* — John Zimmermann
(74) *Attorney, Agent, or Firm* — Meitar Patents Ltd.; Daniel Kligler

(57) ABSTRACT

A system includes (a) an image forming station including multiple print bars arranged along an axis and configured to apply to a substrate being moved along the axis, droplets of printing fluids having multiple colors, respectively, and (b) multiple dryers, which are mounted on the image forming station, and are interleaved with the multiple print bars along the axis, the multiple dryers are configured to dry the droplets applied to the substrate for forming an image on the substrate, at least a dryer among the dryers includes: (i) an illumination assembly, which is configured to dry the droplets by directing the optical radiation to impinge on the substrate, and (ii) a temperature control assembly, which is configured to control a temperature of the substrate by directing a gas to the substrate, the illumination assembly and the temperature control assembly are packaged together in a housing.

19 Claims, 6 Drawing Sheets

Related U.S. Application Data

(60) Provisional application No. 62/939,726, filed on Nov. 25, 2019.

(58) Field of Classification Search
CPC ..... B41J 2/01; B41J 2/447; B41J 2/45; G03G 15/016; G03G 7/00; B41N 10/04; B41N 2210/02; B41N 2210/04; B41M 2205/10; B41M 5/0017; B41M 5/42; B41M 5/41; B32B 15/06; B32B 2037/268; B32B 2307/728; B32B 2307/73; G02B 5/22
See application file for complete search history.

(56) References Cited

U.S. PATENT DOCUMENTS

| | | | | |
|---|---|---|---|---|
| 6,753,050 | B1 | 6/2004 | Dalvey et al. | |
| 9,180,659 | B1 | 11/2015 | Condello | |
| 9,370,941 | B2 * | 6/2016 | Rae | B41F 23/04 |
| 10,606,191 | B2 | 3/2020 | Landa et al. | |
| 10,682,837 | B2 | 6/2020 | Martinez De Leon et al. | |
| 11,833,813 | B2 | 12/2023 | Landa et al. | |
| 2008/0081116 | A1 * | 4/2008 | Makuta | B41J 11/00214 427/372.2 |
| 2008/0238998 | A1 * | 10/2008 | Nakazawa | B41J 11/0015 347/100 |
| 2008/0239044 | A1 * | 10/2008 | Yokota | B41J 11/00218 347/102 |
| 2009/0207224 | A1 * | 8/2009 | Cofler | B41J 13/0072 347/102 |
| 2012/0103212 | A1 * | 5/2012 | Stowe | B41F 31/045 101/147 |
| 2014/0060360 | A1 * | 3/2014 | Moorlag | B41C 1/1033 252/582 |
| 2014/0369722 | A1 | 12/2014 | Soira et al. | |
| 2015/0158304 | A1 * | 6/2015 | Kida | C09D 11/324 347/33 |
| 2015/0266290 | A1 | 9/2015 | Dooley et al. | |
| 2016/0167399 | A1 * | 6/2016 | Ohnishi | B41J 11/00214 347/102 |
| 2019/0033756 | A1 | 1/2019 | Inotaev et al. | |
| 2019/0092040 | A1 | 3/2019 | Yoda et al. | |
| 2019/0105906 | A1 * | 4/2019 | Suzuki | B41J 2/1714 |

FOREIGN PATENT DOCUMENTS

| | | | |
|---|---|---|---|
| JP | 2005215645 | A | 8/2005 |
| JP | 2007072449 | A | 3/2007 |
| JP | 2011081061 | A | 4/2011 |
| JP | 2014019092 | A | 2/2014 |
| JP | 2015155201 | A | 8/2015 |
| JP | 2019018573 | A | 2/2019 |
| KR | 20090101705 | A | 9/2009 |

OTHER PUBLICATIONS

JP2002307815A Machine Translation (by EPO and Google)—published Oct. 23, 2002; Konishiroku Photo Ind.

JP2004126380A Machine Translation (by EPO and Google)—published Apr. 22, 2004; Sumitomo Rubber Ind.

JP2005215645A Machine Translation (by EPO and Google)—published Aug. 11, 2005; Fuji Xerox Co Ltd.

JP2007072449A Machine Translation (by EPO and Google)—published Mar. 22, 2007; Fuji Xerox Co Ltd.

JP2011081061A Machine Translation (by EPO and Google)—published Apr. 21, 2011; Canon KK.

JP2014019092A Machine Translation (by EPO and Google)—published Feb. 3, 2014; Ricoh Co Ltd.

JP2019018573A Machine Translation (by EPO and Google)—published Feb. 7, 2019; Canon KK.

Co-pending U.S. Appl. No. 18/719,273, inventors Landa; Benzion et al., filed Dec. 29, 2022.

JP2015155201A Machine Translation (by EPO and Google)—published Aug. 27, 2015; Xerox Corp.

KR20090101705A Machine Translation (by EPO and Google)—published Sep. 29, 2009; Naraenanotech Corp [KR].

* cited by examiner

DRYING INK IN DIGITAL PRINTING USING INFRARED RADIATION

CROSS-REFERENCE TO RELATED APPLICATIONS

This application is a continuation application of U.S. patent application Ser. No. 17/773,609 filed May 1, 2022, which is a U.S. National Phase of PCT Application PCT/IB2020/060552, which claims the benefit of U.S. Provisional Patent Application 62/939,726, filed Nov. 25, 2019. The disclosures of these related applications are incorporated herein by reference.

FIELD OF THE INVENTION

The present invention relates generally to digital printing processes, and particularly to methods and systems for drying ink applied to a surface during a digital printing process.

BACKGROUND OF THE INVENTION

Optical radiation, such as infrared (IR) and near-IR radiation, has been used for drying ink in various printing processes.

For example, U.S. Patent Application Publication 2012/0249630 describes a process for printing an image including printing a substrate with an aqueous inkjet ink and drying the printed image with a near-infrared drying system. Various embodiments provide a process for inkjet printing and drying inks with improved absorption in the near-IR region of the spectrum for improved drying performance of aqueous, hypsochromic inks, and an inkjet ink set with improved balanced near-IR drying of black and yellow inkjet inks.

SUMMARY OF THE INVENTION

An embodiment of the present invention that is described herein provides a system including a flexible intermediate transfer member (ITM), an illumination assembly, and a temperature control assembly. The ITM includes a stack of at least (i) a first layer, located at an outer surface of the ITM and configured to receive ink droplets from an ink supply subsystem to form an ink image thereon, and to transfer the ink image to a target substrate, and (ii) a second layer including a matrix that holds particles at respective given locations. The second layer is configured to receive optical radiation passing through the first layer, and the particles are configured to heat the ITM by absorbing at least part of the optical radiation. The illumination assembly is configured to dry the droplets of ink by directing the optical radiation to impinge on at least some of the particles. The temperature control assembly is configured to control a temperature of the ITM by directing a gas to the ITM.

In some embodiments, the first and second layers are adjacent to one another, and the particles are arranged at a predefined distance from one another so as to heat the outer surface uniformly. In other embodiments, the particles are embedded within a bulk of the second layer at a given distance from the outer surface so as to heat the outer surface uniformly. In yet other embodiments, the system includes a processor, which is configured to receive a temperature signal indicative of a temperature of the ITM, and, based on the temperature signal, to control at least one of (i) an intensity of the optical radiation, and (ii) a flow rate of the gas.

In an embodiment, the system includes one or more temperature sensors disposed at one or more respective given locations relative to the ITM and configured to produce the temperature signal. In another embodiment, the illumination assembly includes one or more light sources disposed at one or more respective predefined locations relative to the ITM. In yet another embodiment, at least one of the light sources is mounted adjacent to a print bar of the ink supply subsystem, which is configured to direct the ink droplets to the outer surface.

In some embodiments, the illumination assembly includes at least an array including a plurality of the light sources. In other embodiments, the array includes the plurality of the light sources arranged along a moving direction of the ITM.

In an embodiment, the optical radiation includes infrared (IR) radiation, and at least one of the particles includes carbon black (CB). In another embodiment, the gas includes pressurized air, and the temperature control assembly includes an air blower, which is configured to supply the pressurized air.

There is additionally provided, in accordance with an embodiment of the present invention, a method including directing optical radiation to a flexible intermediate transfer member (ITM) including a stack of at least (i) a first layer, located at an outer surface of the ITM for receiving ink droplets to form an ink image thereon, and for transferring the ink image to a target substrate, and (ii) a second layer including a matrix that holds particles disposed at one or more respective given locations. The optical radiation passes through the first layer, the particles are absorbing at least part of the optical radiation for heating the ITM, and the optical radiation impinges on at least some of the particles of the second layer so as to dry the droplets of ink on the outer surface. A temperature of the ITM is controlled by directing a gas to the ITM.

There is further provided, in accordance with an embodiment of the present invention, a method for manufacturing a flexible intermediate transfer member (ITM), the method including producing a first layer, located at an outer surface of the ITM for receiving ink droplets to form an ink image thereon, and for transferring the ink image to a target substrate. A second layer including a matrix that holds particles disposed at one or more respective given locations, is applied to the first layer.

In some embodiments, producing the first layer includes applying the first layer onto a carrier, and the method includes removing the carrier from the ITM after applying at least the second layer.

There is further provided, in accordance with an embodiment of the present invention, a system including a flexible intermediate transfer member (ITM), an illumination assembly, and a temperature control assembly.

In some embodiments, the illumination assembly includes one or more light sources that are disposed at one or more respective predefined locations relative to the ITM, and are configured to direct the optical radiation to impinge on at least some of the particles. In other embodiments, at least one of the light sources is mounted adjacent to a print bar that directs the ink droplets to the ITM.

In an embodiment, the illumination assembly includes at least an array of light sources that are arranged along a moving direction of the ITM, and are configured to direct the optical radiation to impinge on at least some of the particles. In another embodiment, the illumination assembly and the temperature control assembly are packaged in a housing.

The present invention will be more fully understood from the following detailed description of the embodiments thereof, taken together with the drawings in which:

DETAILED DESCRIPTION OF EMBODIMENTS

Overview

Figure 1:
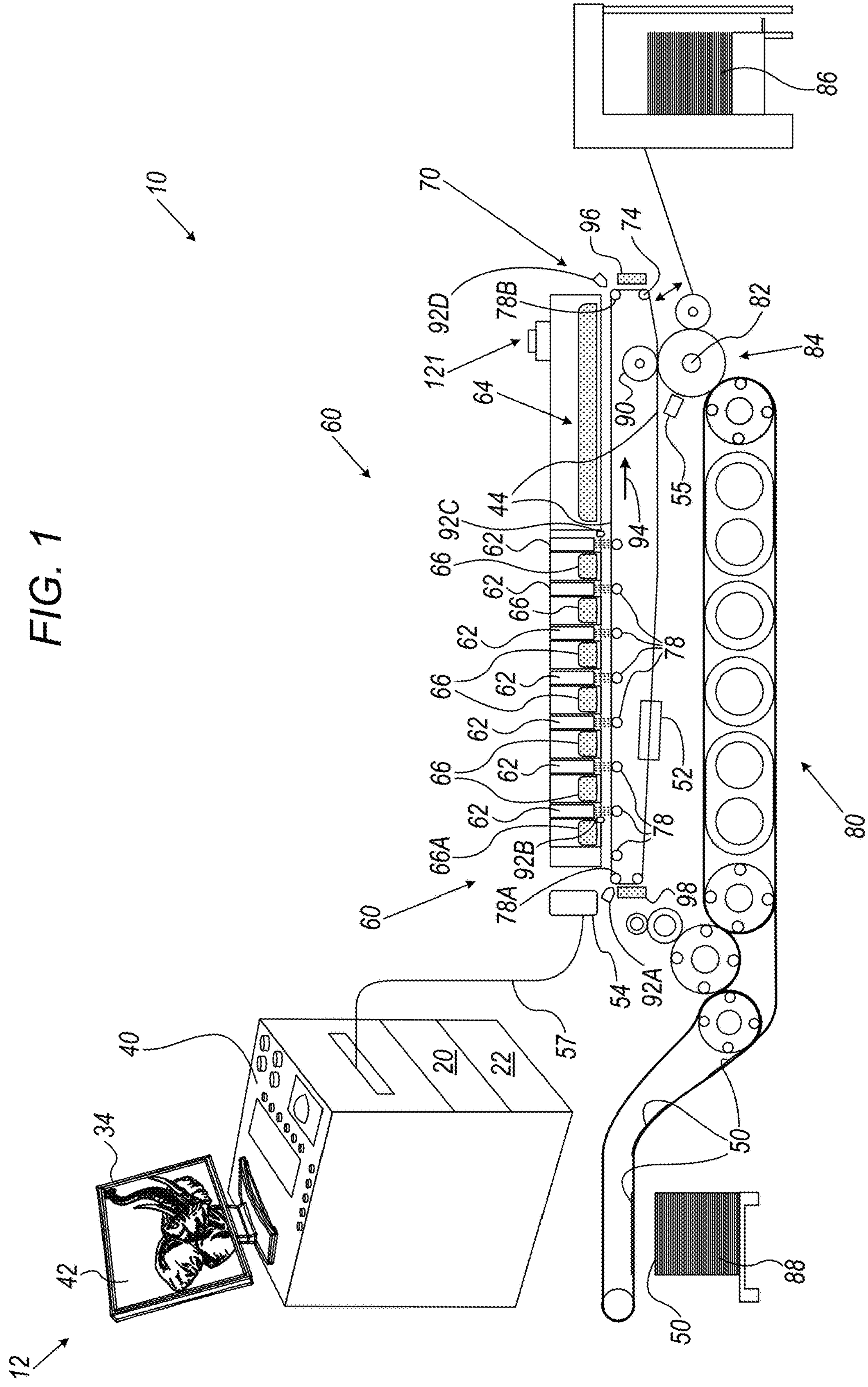
FIGS. 1 and 2 FIG. 2 are schematic side views of digital printing systems, in accordance with some embodiments of the present invention.

Embodiments of the present invention that are described hereinbelow provide improved techniques for drying ink applied to a surface of a substrate during a digital printing process.

In some embodiments, a digital printing system comprises a movable flexible intermediate transfer member (ITM), also referred to herein as a blanket, an image forming station for applying ink droplets to the ITM, an illumination assembly, and a temperature control assembly. The illumination assembly is configured to direct infrared (IR) radiation to the ITM.

In some embodiments, the ITM comprises a multi-layered stack comprising (i) a release layer, which is transparent to the IR radiation and is located at an outer surface of the ITM, facing the illumination assembly. The release layer is configured to receive ink droplets from print bars of the image forming station, such that, when the ITM moves, the print bars form multiple ink images at respective sections of the release layer. Subsequently, the ITM is configured to transfer the ink images to a target substrate, such as sheets or a continuous web.

In some embodiments, the ITM further comprises a layer, also referred to herein as an "IR layer," which is coupled to the release layer and is substantially opaque to the IR radiation. The IR layer has a matrix comprising a suitable type of silicone, and carbon-black (CB) particles embedded within the matrix of the IR layer.

In some embodiments, the IR layer is configured to receive the IR radiation passing through the release layer, and, in response to the IR radiation, the CB particles are configured to heat at least the IR layer and the release layer of the ITM, so as to dry the ink droplets applied to the release layer.

In some embodiments, the CB particles are arranged within the bulk of the IR layer at a predefined distance from one another and at a given distance from the outer surface of the release layer. In such embodiments, because of the low thermal conductivity of the silicone matrix, the heat emitted from the CB particles may be distributed uniformly within the IR layer and the release layer, and thereby may dry the ink uniformly across the outer surface of the release layer.

Note that the ITM may be damaged at a certain temperature, e.g., at about 140° C. or 150° C. In some embodiments, the temperature control assembly, comprises an air blower, which is configured to supply pressurized air, at a temperature of about 30° C., directed to the ITM so as to prevent overheating of the ITM.

In some embodiments, the digital printing system further comprises a processor and multiple temperature sensors mounted at respective locations relative to the ITM. Each of the temperature sensors is configured to produce a temperature signal indicative of the temperature of the ITM at the respective location.

In some cases, the surface of the release layer comprises, between adjacent ink images, a bare section that does not receive the ink droplets, and therefore, the ITM is more prone to overheat at the bare section. In some embodiments, as the ITM moves, the processor is configured to control the temperature sensors to sense the ITM temperature at the bare sections.

In some embodiments, based on the temperature signals, the processor is configured to control the illumination assembly to adjust the intensity of the IR radiation, and/or to control the temperature control assembly to adjust the flow rate of the pressurized air, so as to retain the temperature of the bare sections below the aforementioned certain temperature. In other embodiments, the illumination and cooling assemblies may operate in an open loop, e.g., without measuring and adjusting the temperature.

In some embodiments, the image forming station may comprise multiple print bars, each of which configured to print a different color of ink image. Note that some sections of the ink image may comprise a mixture of first and second different colors of ink printed, respectively and sequentially, by first and second print bars mounted on the digital printing system at a predefined distance from one another.

In some embodiments, the digital printing system has multiple units, each of which comprising one or more IR light sources and a pressurized air outlet coupled, via an outlet valve, to the temperature control assembly. In such embodiments, a unit is mounted between the first and second print bars, and is configured to partially dry the ink droplets of the first color applied to the ITM by the first print bar so that, after applying the droplets of the second color, the first and second colors of ink droplets will be mixed with one another on the surface of the release layer.

In some embodiments, the digital printing system comprises an array of multiple (e.g., ten) units arranged along a moving direction of the ITM so as to obtain a complete drying of the ink image printed by the print bars on the ITM.

The disclosed techniques improve the quality of printed images by obtaining a uniform drying process across the printed image. Moreover, the disclosed techniques improve the productivity of digital printing systems by reducing the time of ink drying, and therefore, reducing the cycle time of the printing process.

System Description

FIG. 1 is a schematic side view of a digital printing system 10, in accordance with an embodiment of the present invention. In some embodiments, system 10 comprises a rolling flexible blanket 44 that cycles through an ink supply subsystem, also referred to herein as an image forming station 60, multiple drying stations, an impression station 84 and a blanket treatment station 52. In the context of the present invention and in the claims, the terms "blanket" and "intermediate transfer member (ITM)" are used interchangeably and refer to a flexible member comprising one or more layers used as an intermediate member configured to receive an ink image and to transfer the ink image to a target substrate, as will be described in detail below.

In an operative mode, image forming station 60 is configured to form a mirror ink image, also referred to herein as "an ink image" (not shown) or as an "image" for brevity, of a digital image 42 on an upper run of a surface of blanket 44. Subsequently the ink image is transferred to a target substrate, (e.g., a paper, a folding carton, a multilayered polymer, or any suitable flexible package in a form of sheets or continuous web) located under a lower run of blanket 44.

In the context of the present invention, the term "run" refers to a length or segment of blanket 44 between any two given rollers over which blanket 44 is guided.

In some embodiments, during installation, blanket 44 may be adhered edge to edge to form a continuous blanket loop (not shown). An example of a method and a system for the installation of the seam is described in detail in U.S. Provisional Application 62/532,400, whose disclosure is incorporated herein by reference.

In some embodiments, image forming station 60 typically comprises multiple print bars 62, each mounted (e.g., using a slider) on a frame (not shown) positioned at a fixed height above the surface of the upper run of blanket 44. In some embodiments, each print bar 62 comprises a strip of print heads as wide as the printing area on blanket 44 and comprises individually controllable print nozzles.

In some embodiments, image forming station 60 may comprise any suitable number of bars 62, each bar 62 may contain a printing fluid, such as an aqueous ink of a different color. The ink typically has visible colors, such as but not limited to cyan, magenta, red, green, blue, yellow, black and white. In the example of FIG. 1, image forming station 60 comprises seven print bars 62, but may comprise, for example, four print bars 62 having any selected colors such as cyan, magenta, yellow and black.

In some embodiments, the print heads are configured to jet ink droplets of the different colors onto the surface of blanket 44 so as to form the ink image (not shown) on the outer surface of blanket 44.

In some embodiments, different print bars 62 are spaced from one another along the movement axis, also referred to herein as a moving direction of blanket 44, represented by an arrow 94. In this configuration, accurate spacing between bars 62, and synchronization between directing the droplets of the ink of each bar 62 and moving blanket 44 are essential for enabling correct placement of the image pattern.

In some embodiments, system 10 comprises dryers 66. In the present example, each dryer 66 comprises an infrared-based (IR-based) heater, which is configured to dry some of the liquid carrier of the ink applied to the ITM surface, by increasing the temperature of blanket 44 and evaporating at least part of the liquid carrier of the ink. In the example of FIG. 1, dryers 66 are positioned in between print bars 62, and are configured to partially dry the ink droplets deposited on the surface of blanket 44.

Note that some sections of the ink image printed on blanket 44 may comprise a mixture of two or more colors of ink, so as to produce a different color. For example, a mixture of cyan and magenta may result in a blue color. In this example, the red print bar may be positioned, along the moving direction of blanket 44 (represented by arrow 94), before the yellow print bar.

In some embodiments, after jetting the red ink at a given position on the surface of blanket 44, a processor 20 of system 10 is configured to control one or more of dryers 66 located between the red and yellow print bars to partially dry the red ink. In such embodiments, after jetting the yellow ink at the given location, the partial drying of the red ink enables the mixing of the red and yellow inks, so as to form the orange color at the given position on the surface of blanket 44.

In some embodiments, blanket 44 has a specification of operational temperatures, for example, blanket 44 is configured to operate at temperatures below about 140° C. or 150° C. in order to prevent damage, such as distortion, to the structure of blanket 44. In some embodiments, system 10 further comprises a temperature control assembly 121, (described in detail in FIGS. 3 and 4 below), which is configured to supply any suitable gas to the surface of blanket 44, so as reduce the heat applied by the IR-based heaters, and thereby, to maintain the temperature of blanket 44 below about 140° C. or 150° C. or any other certain temperature.

In some embodiments, the gas may comprise pressurized air and temperature control assembly 121 may comprise a central air blower, configured to supply the pressurized air, via outlet valves, to dryers 66. In some embodiments, dryer 66 comprises a combination of the aforementioned IR-based heater, for heating blanket 44, and air-flow channels for cooling blanket 44. In such embodiments, the pressurized air may be used for cooling sections of dryer 66 that are heated by the IR-based heater.

In some embodiments, temperature control assembly 121 further comprises an exhaust, which is configured to pump the pressurized air used for cooling blanket 44 and dryer 66, so as to reduce or prevent condensation of ink by products at the surface of the print heads.

In the context of the present disclosure and in the claims, the term "drying unit" may refer to an apparatus comprising a combination of an IR-based heater for heating blanket 44, and air-flow channels for cooling blanket 44. In the example configuration of system 10, each dryer 66 may comprise a single drying unit.

The structure and functionality of temperature control assembly 121 and of dryers 66 are depicted in detail in FIGS. 3 and 4 below.

In some embodiments, this heating between the print bars may assist, for example, in reducing or eliminating condensation at the surface of the print heads and/or in handling satellites (e.g., residues or small droplets distributed around the main ink droplet), and/or in preventing blockage of the inkjet nozzles of the print heads, and/or in preventing the droplets of different color inks on blanket 44 from undesirably merging into one another.

In some embodiments, system 10 comprises a drying station, referred to herein as a main dryer 64, which is configured to dry the ink image applied to the surface of blanket 44 by image forming station 60. Note that at each of dryers 66 is configured to dry ink droplets during the formation of the ink image.

In the example configuration of system 10, main dryer 64 comprises an array of ten drying units arranged in a row parallel to the moving direction of blanket 44. In this configuration, main dryer 64 is configured to receive blanket 44 at any suitable temperature, for example, between about 60° C. and about 100° C. and to increase the temperature of blanket 44 to any suitable temperature, for example, between about 110° C. and about 150° C. after being heated by main dryer 64.

When passing through main dryer 64, blanket 44 (having the ink image thereon) is exposed to the IR radiation and may reach the aforementioned temperature (e.g., about 140° C.). In some embodiments, main dryer 64 is configured to dry the ink more thoroughly by evaporating most or all of the liquid carrier, and leaving on the surface of blanket 44 only a layer of resin and coloring agent, which is heated to the point of being rendered tacky ink film.

The structure and functionality of main dryer 64 will be depicted in detail, for example, in FIG. 4 below.

In some embodiments, system 10 comprises a vertical dryer 96 having an assembly for pumping (e.g., using vacuum) gas residues evaporated from the surface of blanket 44. Additionally or alternatively, vertical dryer 96 may comprise an air knife, which is configured to blow pressurized air (or any other suitable gas) on the surface of blanket 44, so as to reduce the temperature of blanket 44 and/or to remove the aforementioned gas residues from the surface of blanket 44.

In some embodiments, processor 20 is configured to control, in vertical dryer 96, the vacuum level and/or the air pressure, so as to obtain the desired cleanliness and/or temperature on the surface of blanket 44. Note that the cleanliness of the surface of blanket 44 is particularly important before the ink image printed on blanket 44 enters impression station 84 as will be described in detail herein.

In some embodiments, system 10 comprises a blanket pre-heater 98, which comprises an IR radiation source (not shown) having an exemplary length of about 1120 mm or any other suitable length. The IR heat source may comprise any suitable product complying with the specified power density (which is application-dependent) supplied, for example by Heraeus (Hanau, Germany), or by Helios (Novazzano, Switzerland). In such embodiments, blanket pre-heater 98 is configured for uniformly heating blanket 44 to an exemplary temperature of about 75° C., so as to prepare blanket 44 for the printing process (described above) of the ink image, carried out by image forming station 60.

Note that various elements of blanket module 70, such as rollers 78, typically remain at room temperature (e.g., 25° C.) or any other suitable temperature, typically lower than the temperature required for drying the ink jetted on the surface of blanket 44. As a result, blanket 44 is cooling when rolling along these elements of blanket module 70. In some embodiments, processor 20 controls vertical dryer 96 for completion (if needed) of the ink drying before blanket 44 enters impression station 84, and further controls blanket pre-heater 98 for maintaining the specified temperature (e.g., about 75° C.) of blanket 44 before entering image forming station 60.

In other embodiments, blanket pre-heater 98 may comprise an air blower (not shown) configured to supply and direct hot air for heating the surface of blanket 44. The inventors found that using IR radiation reduces the time (compared to hot air) for obtaining the specified temperature of blanket 44 before receiving the ink image from image forming station 60. The reduced time is particularly important when starting up system 10, thus, improving the availability and productivity of system 10. For example, the inventors found that blanket 44 may be heated to about 75° C. within a few (e.g., five) minutes using IR radiation, or within about half hour using the hot air.

In some embodiments, system 10 comprises a blanket module 70 comprising blanket 44. In some embodiments, blanket module 70 comprises one or more rollers 78, wherein at least one of rollers 78 may comprise an encoder (not shown), which is configured to record the position of blanket 44, so as to control the position of a section of blanket 44 relative to a respective print bar 62.

In some embodiments, the encoder of roller 78 typically comprises a rotary encoder configured to produce rotary-based position signals indicative of an angular displacement of the respective roller. Note that in the context of the present invention and in the claims, the terms "indicative of" and "indication" are used interchangeably.

In other embodiments, blanket module 70 may comprise any other suitable apparatus for sensing and/or tracking the position of one or more reference points of blanket 44. For example, blanket 44 may comprise markers disposed on the blanket surface and/or engraved within the blanket. In such embodiments, system 10 may comprise sensing assemblies, configured to sense the markers and to send, e.g., to processor 20, position signals indicative of the positions of respective markers of blanket 44.

In some embodiments, blanket 44 may comprise a fabric made from two or more sets of fibers interleaved with one another. The fabric has an opacity that varies in accordance with a periodic pattern of the interleaved fibers. In some embodiments, system 10 may comprise an optical assembly (not shown) having a light source at one side of blanket 44, and a light detector at the other side of blanket 44. The optical assembly is configured to illuminate blanket 44 with light, to detect the light passing through the fabric, and to derive from the detected light one or more position signals indicative of one or more respective position reference points (e.g., fibers) in the periodic pattern of the fabric.

In some embodiments, based on the signals, processor 20 is configured to control the printing process and to monitor the condition of various elements of system 10, such as blanket 44.

Additionally or alternatively, blanket 44 may comprise any suitable type of integrated encoder (not shown) for controlling the operation of various modules of system 10. One implementation of the integrated encoder is described in detail, for example, in U.S. Provisional Application 62/689,852, whose disclosure is incorporated herein by reference.

In some embodiments, blanket 44 is guided over rollers 78 and a powered tensioning roller, also referred to herein as a dancer assembly 74. Dancer assembly 74 is configured to control the length of slack in blanket 44 and its movement is schematically represented by a double sided arrow. Furthermore, any stretching of blanket 44 with aging would not affect the ink image placement performance of system 10 and would merely require the taking up of more slack by tensioning dancer assembly 74. In some embodiments, dancer assembly 74 may be motorized.

The configuration and operation of rollers 78 are described in further detail, for example, in U.S. Patent Application Publication 2017/0008272 and in the above-mentioned PCT International Publication WO 2013/132424, whose disclosures are all incorporated herein by reference.

In other embodiments, dancer assembly 74 may comprise a pressurized-air based dancer assembly (not shown), comprising an air chamber and a light-weight roller fitted in the air chamber. The air chamber may comprise an inlet and an opening, which is sized and shaped to fit snugly over the roller. The pressurized-air based dancer assembly may comprise a controllable air blower (other than the aforementioned air blower of temperature control assembly 121), which is configured to supply pressurized air, via a given inlet, into the air chamber. The pressurized air applies a uniform pressure to the roller and moves the roller along a longitudinal axis of the air chamber. As a result, the roller may protrude from the air chamber through the opening, and applies a tension to blanket 44 while being rotated by blanket 44. The pressurized-air based dancer assembly is further described, for example, in U.S. provisional application 62/889,069, whose disclosure is incorporated herein by reference.

In some embodiments, system 10 may comprise one or more tension sensors (not shown) disposed at one or more positions along blanket 44. The tension sensors may be integrated in blanket 44 or may comprise sensors external to blanket 44 using any other suitable technique to acquire signals indicative of the mechanical tension applied to blanket 44. In some embodiments, processor 20 and additional controllers of system 10 are configured to receive the signals produce by the tension sensors, so as to monitor the tension applied to blanket 44 and to control the operation of dancer assembly 74.

In impression station 84, blanket 44 passes between an impression cylinder 82 and a pressure cylinder 90, which is configured to carry a compressible blanket.

In some embodiments, system 10 comprises a control console 12, which is configured to control multiple modules of system 10, such as blanket module 70, image forming station 60 located above blanket module 70, and a substrate transport module 80, which is located below blanket module 70 and comprises one or more impression stations as will be described below.

In some embodiments, console 12 comprises processor 20, typically a general-purpose computer, with suitable front end and interface circuits for interfacing with controllers of dancer assembly 74 and with a controller 54, via an electrical cable, referred to herein as a cable 57, and for receiving signals therefrom.

In some embodiments, controller 54, which is schematically shown as a single device, may comprise one or more electronic modules mounted on system 10 at predefined locations. At least one of the electronic modules of controller 54 may comprise an electronic device, such as control circuitry or a processor (not shown), which is configured to control various modules and stations of system 10. In some embodiments, processor 20 and the control circuitry may be programmed in software to carry out the functions that are used by the printing system, and store data for the software in a memory 22. The software may be downloaded to processor 20 and to the control circuitry in electronic form, over a network, for example, or it may be provided on non-transitory tangible media, such as optical, magnetic or electronic memory media.

In some embodiments, console 12 comprises a display 34, which is configured to display data and images received from processor 20, or inputs inserted by a user (not shown) using input devices 40. In some embodiments, console 12 may have any other suitable configuration, for example, an alternative configuration of console 12 and display 34 is described in detail in U.S. Pat. No. 9,229,664, whose disclosure is incorporated herein by reference.

In some embodiments, processor 20 is configured to display on display 34, a digital image 42 comprising one or more segments (not shown) of image 42 and/or various types of test patterns that may be stored in memory 22.

In some embodiments, blanket treatment station 52, is configured to treat the blanket by, for example, cooling the blanket and/or applying a treatment fluid to the outer surface of blanket 44, and/or cleaning the outer surface of blanket 44. At blanket treatment station 52, the temperature of blanket 44 can be reduced to a desired value of temperature. The treatment may be carried out by passing blanket 44 over one or more rollers or blades configured for applying cooling and/or cleaning and/or treatment fluid on the outer surface of the blanket.

In some embodiments, blanket treatment station 52 may be positioned adjacent to impression station 84. Additionally or alternatively, the blanket treatment station may comprise one or more bars (not shown), adjacent to print bars 62. In this configuration, the treatment fluid may be applied to blanket 44 by jetting.

In some embodiments, system 10 comprises one or more temperature sensors 92, in the present example, sensors 92A, 92B, 92C and 92D, disposed at one or more respective given locations relative to blanket 44 and configured to produce signals indicative of the surface temperature of blanket 44, also referred to herein as "temperature signals."

In some embodiments, at least one of temperature sensors 92A-92D may comprise an IR-based temperature sensor, which is configured to sense the temperature based IR radiation emitted from the surface of blanket 44. In other embodiments, at least one of temperature sensors 92A-92D may comprise any other suitable type of temperature sensor.

In the example configuration of FIG. 1, system 10 comprises: (i) a first temperature sensor 92A, disposed in close proximity to a blanket-tension drive roller, referred to herein as a roller 78A, (ii) a second temperature sensor 92B, disposed between a first print bar 62 and a first dryer, referred to herein as a pre-heater 66A, (iii) a third temperature sensor 92C, disposed between the right-most print bar 62 (in the moving direction) and main dryer 64, and (iv) a fourth temperature sensor 92D, disposed in close proximity to a blanket-control drive roller, referred to herein as a roller 78B.

In some embodiments, temperature sensor 92A, which is disposed between blanket pre-heater 98 and image forming station 60, is configured to sense the temperature of blanket 44 before entering image forming station 60. In an embodiment, temperature sensor 92B is positioned (in the moving direction shown by arrow 94) after pre-heater 66A, so as to measure the temperature of blanket 44 before entering the first print bar.

In some embodiments, controller 54 and/or processor 20 are configured to receive temperature signals from one or more of the temperature sensors described above, and to control the printing process based on the received temperature signals, as will be described in detail below.

In other embodiments, the temperature signal from temperature sensor 92B may be sufficient for controlling starting a new cycle of a printing process carried out by image forming station 60, so that temperature sensor 92A may be redundant, and therefore may be removed from the configuration of system 10.

Note that the temperature of blanket 44 is important for the quality of the printing process carried out by image forming station 60. In some embodiments, the temperature of blanket 44 is set to a predefined temperature (e.g., about 70° C.) so as to: (i) dry the ink droplets of a first color applied to the ITM by the first print bar, and (ii) regain the blanket temperature (which is cooled by the ink droplets having a typical temperature of about 30° C. or 35° C.) to the predefined temperature of about 70° C.

In some embodiments, in response to the blanket heating, a controlled amount of vapors of the first printing fluid (e.g., ink) typically evaporate from the blanket surface without adhering to nozzles of any print bars 62. Moreover, based on the required color scheme of the ink image, the temperature of the first ink is control by the blanket temperature, so that, after applying the droplets of the second color, the first and second colors of ink droplets are mixed with one another so as to form the requested color on the surface of a release layer of blanket 44.

In the example configuration of system 10, temperature sensors 92A-92D are positioned after every event or sub-step of the printing process, which affects or may affect the temperature of blanket 44. In some embodiments, based on the temperature signals received from the temperature sensors, processor 20 (and/or controller 54) is configured to control a power source (not shown) to adjust the power density applied to one or more infrared sources (shown for example in FIG. 3 below) of the respective heater.

In such embodiments, processor 20 is configured to adjust the power density applied to the dryers using a closed-loop methodology, both in feed-back and feed-forward modes. The term "feed-back" refers to adjusting the power density in a given dryer based on temperature measured after using the given dryer, so as to obtain the required temperature in a subsequent section of the blanket. The term "feed-forward" refers to adjusting the power density based on temperature measured before using the dryer, so as to compensate for any deviation from the required temperature. In the example configuration of FIG. 1, processor 20 is configured to control the power density applied to the one or more IR source(s) of pre-heaters 98 and 66A, based on the temperature signal received from temperature sensor 92A, using, respectively, feed-back and feed-forward modes of the closed loop. For example, when the signal received from sensor 92A indicates that the temperature of a first section of blanket 44 is below the predefined 70° C. temperature, processor 20 controls the power source to: (i) increase the power density applied to pre-heater 66A for obtaining the 70° C. in the first section of blanket 44 (using the feed-forward mode), and (ii) increase the power density applied to pre-heater 98 for obtaining the 70° C. in a second section of blanket 44, which follows the first section (using the feed-back mode).

In some embodiments, after adjusting the power density applied to the power source(s) of pre-heater 66A, processor 20 receives the temperature signal from temperature sensor 92B. In case the temperature is about 70° C., processor 20 allows the first print bar of image forming station 60, to apply droplets of the first ink to blanket 44. But in case the temperature measured by temperature sensor 92B is substantially different from about 70° C. (e.g., about 50° C.), processor 20 prevents the print bars of image forming station 60 from applying ink droplets to blanket 44, and controls the power source for adjusting the blanket temperature to the predefined temperature of about 70° C. Only after obtaining the 70° C., processor 20 controls image forming station 60 to resume the printing process using print bars 62, as described above.

In some embodiments, using the techniques described above processor 20 is configured to: (i) control the power density applied to main dryer 64, based on temperature signals received from temperature sensor 92C, and (ii) control the power density applied to vertical dryer 96, based on temperature signals received from temperature sensor 92D. Additionally or alternatively, processor 20 may use the signals received from temperature sensor 92D for adjusting the power density supplied to main dryer 64.

In some embodiments, in response to receiving the temperature signals, processor 20 is configured to control the blanket temperature by adjusting the flow rate of the pressurized air in the air-flow channels shown and described in detail in FIGS. 3 and 4 below. Note that processor 20 is configured to use the feed-forward and feed-back methodology to carry out the closed-loop control on relevant air blowers of system 10. For example, when the measured temperature exceeds the required temperature of blanket 44, processor 20 is configured to control the air blowers to increase the flow of the pressurized air applied to blanket 44. Similarly, when the measured temperature is below the required temperature of blanket 44, processor 20 is configured to control the air blowers to reduce the flow of the pressurized air applied to blanket 44.

In some embodiments, processor 20 is configured to control both the intensity of IR radiation (by adjusting the power density supply) and the flow of the pressurized air, at the same time, so as to control the temperature of blanket 44. For example, in response to receiving from temperature sensor 92D, a signal indicating that the temperature of blanket 44 is substantially different than about 140° C., processor 20 may control at least one of main dryer 64 and vertical dryer 96, to adjust the intensity of IR radiation and/or the flow of the pressurized air so as to obtain the specified temperature of about 140° C. on blanket 44.

In other embodiments, based on the aforementioned temperature signals, processor 20 is further configured to control the operation of other assemblies and stations of system 10, such as but not limited to blanket treatment station 52. Examples of such treatment stations are described, for example, in PCT International Publications WO 2013/132424 and WO 2017/208152, whose disclosures are all incorporated herein by reference.

Additionally or alternatively, treatment fluid may be applied to blanket 44, by jetting, prior to the ink jetting at the image forming station.

In the example of FIG. 1, station 52 is mounted between impression station 84 and image forming station 60, yet, station 52 may be mounted adjacent to blanket 44 at any other or additional one or more suitable locations between impression station 84 and image forming station 60. As described above, station 52 may additionally or alternatively comprise on a bar adjacent to image forming station 60.

In the example of FIG. 1, impression cylinder 82 impresses the ink image onto the target flexible substrate, such as an individual sheet 50, conveyed by substrate transport module 80 from an input stack 86 to an output stack 88 via impression cylinder 82.

In some embodiments, the lower run of blanket 44 selectively interacts at impression station 84 with impression cylinder 82 to impress the image pattern onto the target flexible substrate compressed between blanket 44 and impression cylinder 82 by the action of pressure of pressure cylinder 90. In the case of a simplex printer (i.e., printing on one side of sheet 50) shown in FIG. 1, only one impression station 84 is needed.

In other embodiments, module 80 may comprise two or more impression cylinders so as to permit one or more duplex printing. The configuration of two impression cylinders also enables conducting single sided prints at twice the speed of printing double sided prints. In addition, mixed lots of single and double sided prints can also be printed. In alternative embodiments, a different configuration of module 80 may be used for printing on a continuous web substrate. Detailed descriptions and various configurations of duplex printing systems and of systems for printing on continuous web substrates are provided, for example, in U.S. Pat. Nos. 9,914,316 and 9,186,884, in PCT International Publication WO 2013/132424, in U.S. Patent Application Publication 2015/0054865, and in U.S. Provisional Application 62/596,926, whose disclosures are all incorporated herein by reference.

As briefly described above, sheets 50 or continuous web substrate (not shown) are carried by module 80 from input stack 86 and pass through the nip (not shown) located between impression cylinder 82 and pressure cylinder 90. Within the nip, the surface of blanket 44 carrying the ink image is pressed firmly, e.g., by compressible blanket (not shown), of pressure cylinder 90 against sheet 50 (or other suitable substrate) so that the ink image is impressed onto the surface of sheet 50 and separated neatly from the surface of blanket 44. Subsequently, sheet 50 is transported to output stack 88.

In the example of FIG. 1, rollers 78 are positioned at the upper run of blanket 44 and are configured to maintain blanket 44 taut when passing adjacent to image forming station 60. Furthermore, it is particularly important to control the speed of blanket 44 below image forming station 60 so as to obtain accurate jetting and deposition of the ink droplets, thereby placement of the ink image, by forming station 60, on the surface of blanket 44.

In some embodiments, impression cylinder 82 is periodically engaged to and disengaged from blanket 44 to transfer the ink images from moving blanket 44 to the target substrate passing between blanket 44 and impression cylinder 82. In some embodiments, system 10 is configured to apply torque to blanket 44 using the aforementioned rollers and dancer assemblies, so as to maintain the upper run taut and to substantially isolate the upper run of blanket 44 from being affected by mechanical vibrations occurring in the lower run.

In some embodiments, system 10 comprises an image quality control station 55, also referred to herein as an automatic quality management (AQM) system, which serves as a closed loop inspection system integrated in system 10. In some embodiments, station 55 may be positioned adjacent to impression cylinder 82, as shown in FIG. 1, or at any other suitable location in system 10.

In some embodiments, station 55 comprises a camera (not shown), which is configured to acquire one or more digital images of the aforementioned ink image printed on sheet 50. In some embodiments, the camera may comprises any suitable image sensor, such as a Contact Image Sensor (CIS) or a Complementary metal oxide semiconductor (CMOS) image sensor, and a scanner comprising a slit having a width of about one meter or any other suitable width. In the context of the present disclosure and in the claims, the terms "about" or "approximately" for any numerical values or ranges indicate a suitable dimensional tolerance that allows the part or collection of components to function for its intended purpose as described herein. For example, "about" or "approximately" may refer to the range of values ±20% of the recited value, e.g. "about 90%" may refer to the range of values from 72% to 100%. In some embodiments, station 55 may comprise a spectrophotometer (not shown) configured to monitor the quality of the ink printed on sheet 50.

In some embodiments, the digital images acquired by station 55 are transmitted to a processor, such as processor 20 or any other processor of station 55, which is configured to assess the quality of the respective printed images. Based on the assessment and signals received from controller 54, processor 20 is configured to control the operation of the modules and stations of system 10. In the context of the present invention and in the claims, the term "processor" refers to any processing unit, such as processor 20 or any other processor or controller connected to or integrated with station 55, which is configured to process signals received from the camera and/or the spectrophotometer of station 55. Note that the signal processing operations, control-related instructions, and other computational operations described herein may be carried out by a single processor, or shared between multiple processors of one or more respective computers.

In some embodiments, station 55 is configured to inspect the quality of the printed images and test pattern so as to monitor various attributes, such as but not limited to full image registration with sheet 50, color-to-color (C2C) registration, printed geometry, image uniformity, profile and linearity of colors, and functionality of the print nozzles. In some embodiments, processor 20 is configured to automatically detect geometrical distortions or other errors in one or more of the aforementioned attributes. For example, processor 20 is configured to compare between a design version (also referred to herein as a "master" or a "source image" of a given digital image and a digital image of the printed version of the given image, which is acquired by the camera.

In other embodiments, processor 20 may apply any suitable type image processing software, e.g., to a test pattern, for detecting distortions indicative of the aforementioned errors. In some embodiments, processor 20 is configured to analyze the detected distortion in order to apply a corrective action to the malfunctioning module, and/or to feed instructions to another module or station of system 10, so as to compensate for the detected distortion.

In some embodiments, processor 20 is configured to detect, based on signals received from the spectrophotometer of station 55, deviations in the profile and linearity of the printed colors.

In some embodiments, processor 20 is configured to detect, based on the signals acquired by station 55, various types of defects: (i) in the substrate (e.g., blanket 44 and/or sheet 50), such as a scratch, a pin hole, and a broken edge, and (ii) printing-related defects, such as irregular color spots, satellites, and splashes.

In some embodiments, processor 20 is configured to detect these defects by comparing between a section of the printed and a respective reference section of the original design, also referred to herein as a master. Processor 20 is further configured to classify the defects, and, based on the classification and predefined criteria, to reject sheets 50 having defects that are not within the specified predefined criteria.

In some embodiments, the processor of station 55 is configured to decide whether to stop the operation of system 10, for example, in case the defect density is above a specified threshold. The processor of station 55 is further configured to initiate a corrective action in one or more of the modules and stations of system 10, as described above. The corrective action may be carried out on-the-fly (while system 10 continue the printing process), or offline, by stopping the printing operation and fixing the problem in a respective modules and/or station of system 10. In other embodiments, any other processor or controller of system 10 (e.g., processor 20 or controller 54) is configured to start a corrective action or to stop the operation of system 10 in case the defect density is above a specified threshold.

Additionally or alternatively, processor 20 is configured to receive, e.g., from station 55, signals indicative of additional types of defects and problems in the printing process of system 10. Based on these signals processor 20 is configured to automatically estimate the level of pattern placement accuracy and additional types of defects not mentioned above. In other embodiments, any other suitable method for examining the pattern printed on sheets 50 (or on any other substrate described above), can also be used, for example, using an external (e.g., offline) inspection system, or any type of measurements jig and/or scanner. In these embodiments, based on information received from the external inspection system, processor 20 is configured to initiate any suitable corrective action and/or to stop the operation of system 10.

The configuration of system 10 is simplified and provided purely by way of example for the sake of clarifying the present invention. The components, modules and stations described in printing system 10 hereinabove and additional components and configurations are described in detail, for example, in U.S. Pat. Nos. 9,327,496 and 9,186,884, in PCT International Publications WO 2013/132438, WO 2013/132424 and WO 2017/208152, in U.S. Patent Application Publications 2015/0118503 and 2017/0008272, whose disclosures are all incorporated herein by reference.

The particular configurations of system 10 is shown by way of example, in order to illustrate certain problems that are addressed by embodiments of the present invention and to demonstrate the application of these embodiments in enhancing the performance of such systems. Embodiments of the present invention, however, are by no means limited to this specific sort of example system, and the principles described herein may similarly be applied to any other sorts of printing systems.

For example, in other embodiments, dryer 66 and/or blanket pre-heater 98 may comprise more than one source of IR radiation. Similarly, main dryer 64 may comprise any other suitable number of drying units, or any other suitable type of ink-drying apparatus.

In alternative embodiments, at least one of the dryers may comprise a radiation sources configured to emit radiation other than IR. For example, near IR, visible light, ultraviolet (UV), or any other suitable wavelength or ranges of wavelengths.

Figure 2:
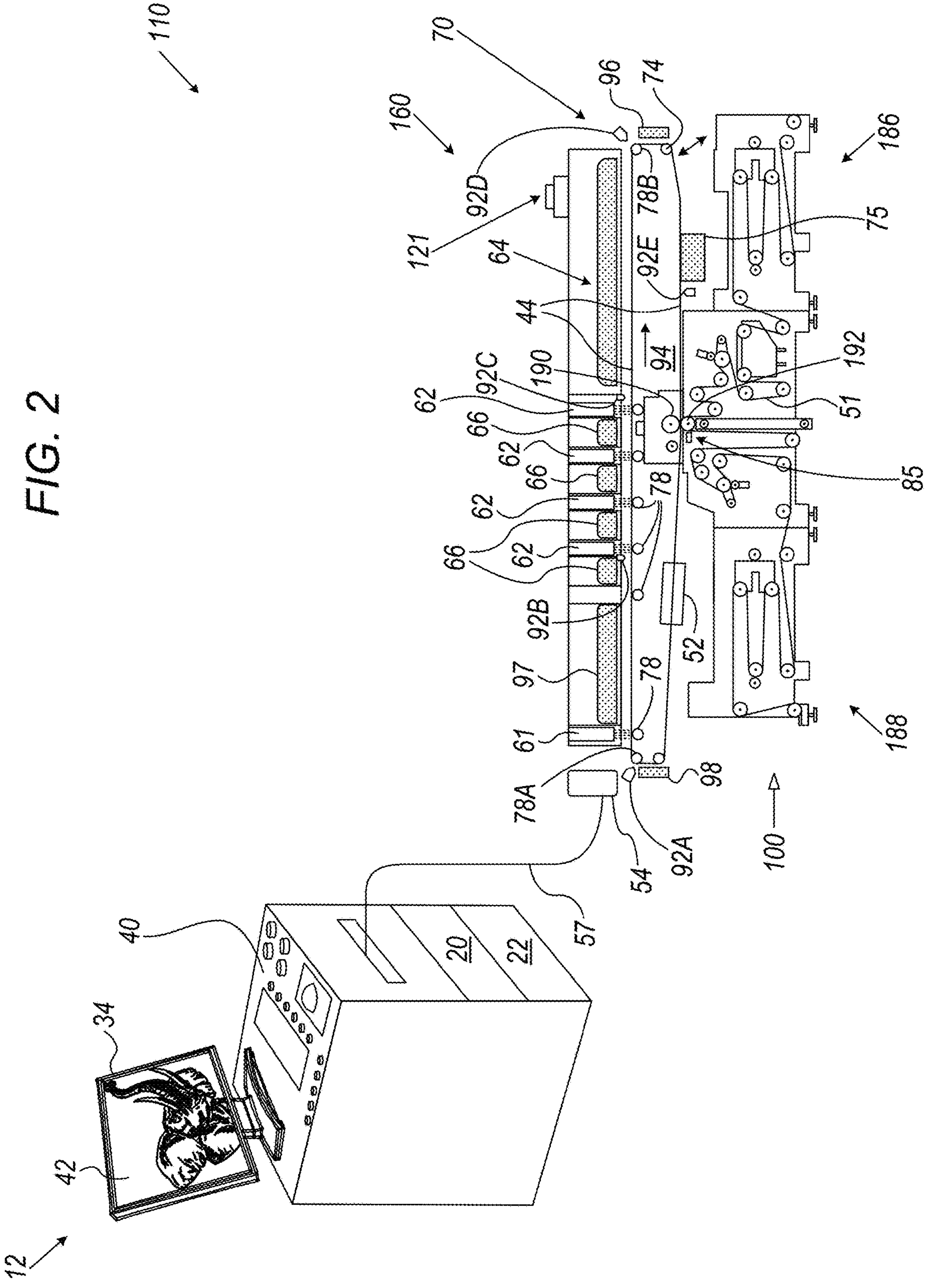

FIG. 2 is a schematic side view of a digital printing system 110, in accordance with an embodiment of the present invention. In some embodiments, system 110 comprises blanket 44 that cycles through an image forming station 160, and through drying station 64, vertical dryer 96, blanket pre-heater 98, and blanket treatment station 52 described in FIG. 1 above.

In some embodiments, system 110 is configured to transfer the ink images from moving blanket 44 to a continuous flexible web substrate, referred to herein as web 51, which is the target substrate of system 110. In such embodiments, system 110 comprises a substrate transfer module 100, which is configured to convey web 51 from a pre-print buffer unit 186, via one or more impression stations 85 for receiving the ink image from blanket 44, to a post-print buffer unit 188.

Each impression station 85 may have any configuration suitable for transferring the ink image from blanket 44 to web 51. In some embodiments, the lower run of blanket 44 may selectively interact, at impression station 85, with an impression cylinder 192 to impress the image pattern onto web 51 compressed between blanket 44 and impression cylinder 192 by the action of pressure of a pressure cylinder 190. In case of a simplex printer (i.e., printing on one side of web 51) shown in FIG. 2, only one impression station 85 is needed. In case of a duplex printed (i.e., printing on both sides of web 51), which is not shown in FIG. 2, system 110 may comprise, for example, two impression stations 85.

In some embodiments, substrate transfer module 100 may have any suitable configuration for conveying web 51. One example implementation is described in detail in U.S. Provisional Application 62/784,576, whose disclosure is incorporated herein by reference.

In some embodiments, web 51 comprises one or more layers of any suitable material, such as an aluminum foil, a paper, polyester (PE), polyethylene terephthalate (PET), biaxially oriented polypropylene (BOPP), oriented polyamide (OPA), biaxially oriented polyamide (BOPA), other types of oriented polypropylene (OPP), a shrinked film also referred to herein as a polymer plastic film, or any other materials suitable for flexible packaging in a form of continuous web, or any suitable combination thereof, e.g., in a multilayered structure. Web 51 may be used in various applications, such as but not limited to food packaging, plastic bags and tubes, labels, decoration and flooring.

In some embodiments, image forming station 160 typically comprises multiple print bars 62, each mounted (e.g., using a slider) on a frame (not shown) positioned at a fixed height above the surface of the upper run of blanket 44. In some embodiments, each print bar 62 comprises a plurality of print heads arranged so as to cover the width of the printing area on blanket 44 and comprises individually controllable print nozzles, as also described in FIG. 1 above.

In some embodiments, image forming station 160 may comprise any suitable number of print bars 62, each print bar 62 may contain the aforementioned printing fluid, such as the aqueous ink. The ink typically has visible colors, such as but not limited to cyan, magenta, red, green, blue, yellow, black and white. In the example of FIG. 2, image forming station 160 comprises a white print bar 61 and four print bars 62 having any selected colors such as cyan, magenta, yellow and black.

In some printing applications white ink is applied to the surface of web 51 before all other colors, and in some cases it is important that in at least some sections of web 51 the white color will not be mixed with the other colors of ink.

In some embodiments, system 110 comprises a white-ink drying station, referred to herein as a white dryer 97, which is configured to dry the white ink applied to the surface of blanket 44 by image forming station 160. In such embodiments, white dryer 97 may comprise five drying units, each of which comprising a combination of the aforementioned IR-based heater for heating blanket 44, and one or more air-flow channels for cooling blanket 44.

In other embodiments, white dryer 97 may comprise any other configuration suitable for drying the white ink, for example, white dryer 97 may comprise any other number of drying units, or may comprise any other suitable dryer apparatus using any other suitable drying technique.

In an embodiment, white dryer 97 is controlled by processor 20 and/or by controller 54, and is configured to dry the white ink applied to the surface of blanket 44 by white print bar 61. In this embodiment, processor 20 and/or controller 54 are configured to control white dryer 97 for partially or fully drying the white ink applied to the surface of blanket 44.

In the configuration of system 110, white dryer 97 replaces one dryer 66 used for drying any color of ink other than white. Note that in the present configuration, system 110 does not have a print bar between white dryer 97 and the first dryer 66, but in other embodiments, system 110 may have any suitable printing components (e.g., a print bar) or sensing components (e.g., a temperature sensor or any other type of sensor), between white dryer 97 and the first dryer 66.

In other embodiments, system 110 may comprise any other suitable type of dryer for drying, or partially drying, any particular color of ink other than white.

In other printing applications, the white ink may be applied to the surface of web 51 after all other colors. In alternative embodiments, the white ink may be applied to the surface of web 51, using a subsystem external to or integrated with system 110. In such embodiments, the white ink is applied to the surface of web 51 before or after applying the other colors to the surface of blanket 44, using image forming station 160, and particularly, before or after applying the other colors to the surface of web 51 in impression station 85.

In some embodiments, temperature sensor 92B is disposed between the aforementioned first dryer 66 and print bar 62, so as to confirm the surface temperature of blanket 44 before applying the ink having a color other than white using print bar 62. Moreover, temperature sensor 92B is disposed between the last print bar of image forming station 160, and main dryer 64. Note that temperature sensors 92A, 92C and 92D are disposed at the same positions in both system 110 and system 10 of FIG. 1 above. Temperature sensor 92B, however, is disposed, along the path of blanket 44, after the white-color printing and drying (in the present example, after print bar 61 and dryer 97) and before the first print bar 62 of the colors other than white (e.g., cyan, magenta, yellow, black or any other color).

In some embodiments, temperature sensors 92B, 92C and 92D are disposed after processing sub-steps that typically affect or may affect the temperature of blanket 44, as also described in FIG. 1 above.

In some embodiments, system 110 may comprise a drying station, referred to herein as a bottom dryer 75, which is configured to emit infrared light or any other suitable frequency, or range of frequencies, of light for drying the ink image formed on blanket 44 using the technique described above. In the example of FIG. 2, bottom dryer 75 may comprise five drying units, each of which comprising a combination of the aforementioned IR-based heater for heating blanket 44, and one or more air-flow channels for cooling blanket 44.

In some embodiments, system 110 comprises a temperature sensor 92E, disposed between bottom dryer 75 and impression station 85, typically in closer proximity to bottom dryer 75.

In some embodiments, processor 20 (and/or controller 54) is configured to control the power source (not shown) described in FIG. 1 above, to adjust the power density applied to one or more infrared sources (shown in FIGS. 3 and 4 below) of the respective heater and/or dryer, so as to retain the predefined temperature of blanket 44 along the respective section of system 110.

In some embodiments, using the techniques described in FIG. 1 above, processor 20 (and/or controller 54) is configured to perform a closed-loop control on the temperature profile of blanket 44 along the respective sections of system 110. The control is carried out based on the temperature signals received from at least one of temperature sensors 92A-92E, and based on the temperature signals, processor 20 controls the power density applied to the IR power sources of the respective IR-based heaters (e.g., one or more of heater 98 and dryers 97, 66, 64, 96 and 75).

In other embodiments, bottom dryer 75 may comprise any other suitable configuration adapted for drying the ink at the lower run of blanket 44, before the blanket enters impression station 85.

In some embodiments, processor 20 and/or controller 54 are configured to control each dryer of system 10 (shown in FIG. 1) and system 110 (shown in FIG. 1) selectively.

The control may be carried out based on various conditions of the particular digital printing application. For example, based on the type, order and surface coverage level of colors applied to the surface of blanket 44, and based on the type of blanket 44 and target substrate (e.g., sheet 50 or web 51).

The term “coverage level” refers to the amount of color applied to the surface of blanket 44. For example, a 250% coverage level refers to two and half ink layers applied to a predefined section (or the entire area) of the ink image specified for being printed on blanket 44 and subsequently, for being transferred to the target substrate. Note that the two and half ink layers may comprise three or more of the aforementioned colors of ink as described above. It will be understood that larger coverage level typically requires larger flux of IR irradiation, and therefore, higher flow of air for cooling blanket 44.

In other embodiments, the ink drying process may be carried out in an open loop, e.g., without controlling at least one of (a) the intensity of the IR radiation and (b) the pressurized-air flow rate by temperature control assembly 121. For example, as part of a process recipe for printing a particular image, a recipe parameter may comprise the coverage level of the ink image, and processor 20 and/or controller 54 may preset one or more of (a) the intensity of the IR radiation and (b) the pressurized-air flow rate by temperature control assembly 121, so as to dry the ink and maintain the temperature of blanket 44 below the specified temperature (e.g., about 140° C. or about 150° C.).

The particular configurations of system 110 is shown by way of example, in order to illustrate certain problems that are addressed by embodiments of the present invention and to demonstrate the application of these embodiments in enhancing the performance of such systems. Embodiments of the present invention, however, are by no means limited to this specific sort of example system, and the principles described herein may similarly be applied to any other sorts of printing systems.

A Drying Unit Implemented in an Image Pinning Unit

Figure 3:
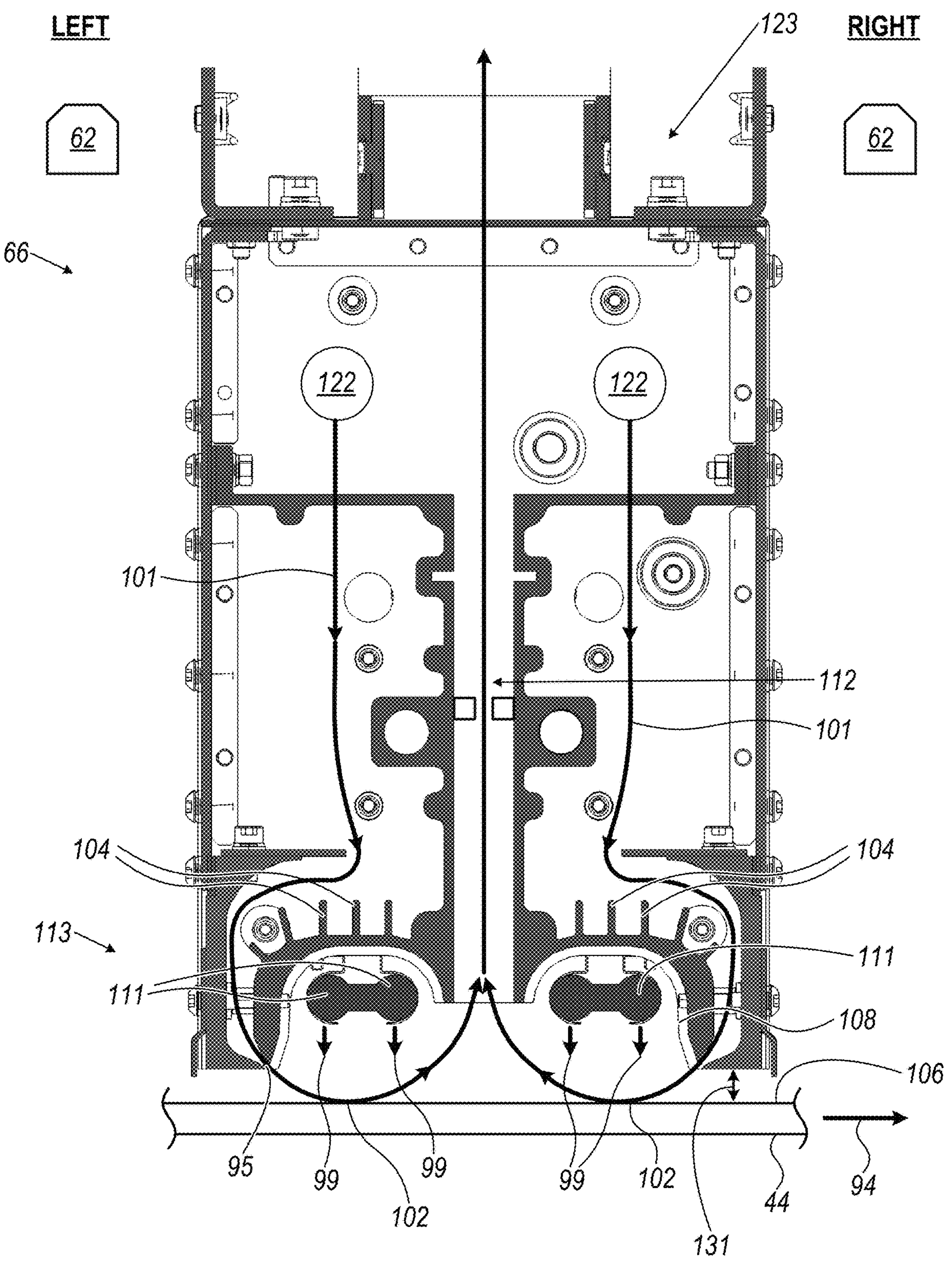
FIG. 3 is a schematic side view of a dryer for drying ink in a digital printing process, in accordance with an embodiment of the present invention.

FIG. 3 is a schematic side view of dryer 66 for drying the ink applied by print bars 62, in accordance with an embodiment of the present invention. In some embodiments, dryer 66 comprises a single drying unit, such as the drying unit briefly described in FIG. 1 above and further described in detail herein.

In some embodiments, dryer 66 comprises one or more openings to an air inlet channel (AIC) 122, having an air blower and configured to supply pressurized air 101 (or any other type of suitable gas) into dryer 66.

In some embodiments, dryer 66 further comprises one or more openings to an air outlet channel (AOC) 123, having an air extraction apparatus (e.g., a suitable type of vacuum or negative pressure pump) configured to draw pressurized air 101 after cooling at least blanket 44, as will be described herein.

In the concept of the present disclosure and in the claims, the term “temperature control assembly” refers to at least one of AIC 122 and AOC 123 or a combination thereof, and is configured to direct pressurized air 101 (or any other suitable type of gas) to an outer surface 106 of blanket 44 so as to reduce the temperature of blanket 44 below the specified temperature (e.g., about 140° C. or about 150° C.), as will be described herein.

In some embodiments, dryers 66 are typically positioned within image forming station 60, and main dryer 64 is positioned between image forming station 60 and impression station 84 such that the drying process of the ink image applied to blanket 44 is carried out before the ink image is transferred to the target substrate (e.g., sheet 50) in impression station 84. Note that temperature control assembly 121 is configured to supply pressurized air 101, e.g., via pipes or tubes (not shown), to dryers 66 and main dryer 64, so as to control the temperature of blanket 44 within the specified temperature range described above. In other embodiments, system 10 may comprise multiple AICs 122 and/or AOCs 123, e.g., a first set of AIC 122 and AOC 123 for dryers 66 and a second set of AIC 122 and AOC 123 for main dryer 64. In alternative embodiments, system 10 may comprise any other suitable configuration of AICs 122 and/or AOCs 123 controlled by processor 20 and/or by local controllers that are synchronized with and/or controlled by processor 20.

In some embodiments, dryer 66 comprises one or more IR-based heaters, in the present example an illumination assembly 113 having IR radiation sources, referred to herein as sources 111 for brevity. In the example of FIG. 3, dryer 66 comprises two pairs of sources 111 arranged in two respective cavities of dryer 66. Each source 111 is configured to direct a beam 99 of IR radiation to blanket 44. For example, each source 111 is configured to emit a power density between about 30 w/cm and about 300 w/cm toward surface 106 of blanket 44.

In other embodiments, dryer 66 may comprise any other suitable number of sources 111 (or any other suitable type of one or more light sources configured to emit IR or other suitable one or more wavelengths of light) having any suitable geometry and arranged in any suitable configuration.

In some embodiments, dryer 66 may comprise one or more reflectors 108, coupled between sources 111 and the cavity of dryer 66. Reflectors 108 are configured to reflect beams 99 emitted from sources 111 toward blanket 44 so as to improve the efficiency and speed of the IR-based drying process, and for reducing the amount of IR radiation (and therefore excess heating) applied to dryer 66 by beams 99.

For example, each reflector 108 may reflect about 90% of beams 99 toward blanket 44 and may absorb the remaining 10%, which may increase the temperature at the cavities of dryer 66.

In some embodiments, dryer 66 comprises a heat transfer assembly (HTA) 104, which comprises heat conducting materials (e.g., copper, aluminum or other metallic or non-metallic materials) arranged around reflectors 108 as heat-conducting ribs and traces. HTA 104 IS configured to dissipate the excess heat away from the respective cavities of dryer 66.

In the example configuration of dryer 66, pressurized air 101 enters dryer 66, via AIC 122, at an exemplary temperature of about 30° C. or at any other suitable temperature between about 5° C. and about 100° C. Subsequently, pressurized air 101 flows through an internal channel of dryer 66 for transporting heat (e.g., by heat convection) away from HTA 104, and then directed, via an opening 95 of dryer 66, toward a position 102 on surface 106. Pressurized air 101 flow on surface 106 for transferring the heat from blanket 44, and subsequently, AOC 123 draws pressurized air 101 away from surface 106, via an air outlet passage 112 of dryer 66, for maintaining the temperature of blanket 44 below the specified temperature described above.

As shown in FIGS. 1-3, dryer 66 may be located adjacent to a print bar 62, and typically between two adjacent print bars 62. In some embodiments, dryer 66 is configured to draw pressurized air 101 via air outlet passage 112, so that pressurized air 101 will not make physical contact with any of print bars 62. Note that pressurized air 101 comprises vapors of the ink ingredients that may interfere with the printing process. For example, such vapors may partially or fully block nozzles of print bars 62, which may reduce the quality of the printed image (e.g., missing ink in case of a fully-blocked nozzle, or defects comprising clusters of dried ink in case of partially-blocked nozzle).

In some embodiments, the structure of dryer 66 prevents mixture of pressurized air 101 incoming from AIC 122 with pressurized air 101 flowing through opening 95 into surface 106. As described above, after flowing through opening 95, pressurized air 101 is forced to flow via air outlet passage 112, into AOC 123. In other words, the outflowing air that may contain residues of ink, and the incoming air for cooling surface 106 are never mixed with one another within dryer 66.

In some embodiments, beam 99 is directed to position 102 based on the position of sources 111 within the cavity of dryer 66. Similarly, dryer 66 is designed such that pressurized air 101 is directed to position 102 for cooling blanket 44. Note that each drying unit of dryer 66 comprises two sets, of IR-based heating and pressurized-air-based cooling, having air outlet passage 112 therebetween. In this configuration pressurized air 101 inflows toward blanket 44 from the sides of dryer 66, and outflows away from blanket 44 through air outlet passage 112 located at the center of dryer 66, so as to prevent contact between pressurized air 101 and print bars 62.

In some embodiments, a distance 131, which is the distance between dryer 66 and surface 106 may be used for controlling the amount of the IR-based heating and air-based cooling. In principle, smaller distance 131 accelerates the heating rate of blanket 44. In other words, when distance 131 is small, in response to IR-based heating, blanket 44 will reach the specified temperature (e.g., about 140° C. or about 150° C.) faster, resulting in faster drying of the ink on the surface of blanket 44.

In some embodiments, distance 131 may be predetermined, e.g., when mounting dryer 66 on the frame of system 10 and/or system 110. In other embodiments, distance 131 may be controlled, e.g., by using any suitable mount for moving dryer 66 relative to blanket 44.

In some embodiments, by controlling distance 131, processor 20 may control the intensity and uniformity of the power density applied, by source 111, to predefined sections of blanket 44. For example, larger distance 131 may result in smaller power density applied to a given section of blanket 44, but may improve the heating uniformity within the given section and in close proximity thereto. Similarly, the proximity between blanket 44 and dryer 66 may affect the level of cooling by dryer 66. For example, larger distance 131 reduces the cooling effectivity of the blanket surface by pressurized air 101.

As described above, when blanket 44 is moved in the direction shown by arrow 94, print bar 62 that is located adjacent to dryer 66, jets ink droplets to blanket 44. In some embodiments that will be described in more detail in FIG. 6 below, dryer 66 and the blanket are designed such that beam 99 is configured to heat blanket 44, and the increased temperature induces evaporation of the liquid carried of the ink so as to dry or partially dry the ink on surface 106. Note that beam 99 is not directed to the ink for the evaporation, but is directed to blanket 44 for increasing the temperature of the blanket. Similarly, pressurized air 101 is directed to blanket 44, by AIC 122, and extracted from blanket by AOC 123, so as to reduce the temperature thereof.

The particular configuration of the drying unit of dryer 66 is provided by way of example, in order to illustrate certain problems, such as partially drying the ink image applied to blanket 44 and cooling the blanket, which are addressed by embodiments of the present invention and to demonstrate the application of these embodiments in enhancing the performance of digital printing systems such as systems 10 and 110 described above. Embodiments of the present invention, however, are by no means limited to this specific configuration and sort of example drying unit, and the principles described herein may similarly be applied to any other sorts of drying units in digital printing systems or any other type of printing systems.

In other embodiments, pressurized air 101 may be used solely for reducing the temperature of blanket 44, whereas a separate (e.g., dedicated) cooling apparatus may be used for cooling HTA 104.

Dryers Comprising Multiple Drying Units

Figure 4:
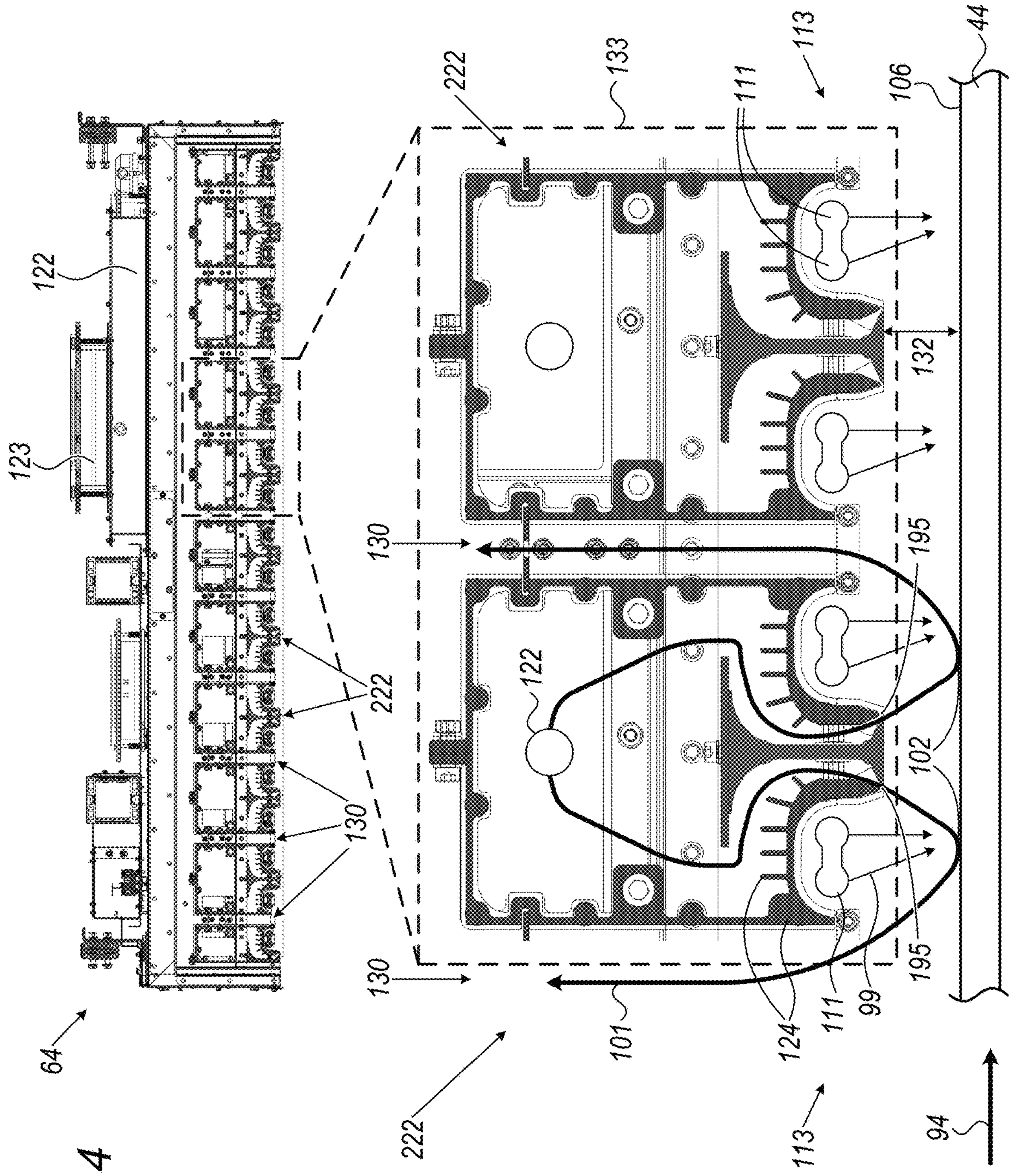
FIG. 4 is a schematic side view of a main dryer for drying ink in a digital printing process, in accordance with an embodiment of the present invention.

FIG. 4 is a schematic side view of main dryer 64, in accordance with an embodiment of the present invention. In some embodiments, main dryer 64 comprises multiple drying units 222, and an air outlet passage 130 between a respective pair of neighboring drying units 222. Reference is now made to an inset 133 showing a pair of drying units 222 and air outlet passage 130 located therebetween. Each drying unit 222 is positioned at a distance 132 from surface 106 of blanket 44. Note that distance 132 may differ from distance 131 and may be controllable, e.g., using a mount as described in FIG. 3 above. Alternatively, distance 132 may be predetermined based on the distance between the frame of image forming station and the position of blanket 44.

In some embodiments, each drying unit 222 has two cavities, each of which having a pair of sources 111 of illumination assembly 113, which are configured for directing beam 99 so as to heat blanket 44, using the technique described for dryer 66 in FIG. 3 above. Drying unit 222 further comprises a heat transfer assembly (HTA) 124 having the same cooling functionality of HTA 104, but a different structure that fits the structure of drying unit 222.

In some embodiments, pressurized air 101 enters drying unit 222, via AIC 122, at an exemplary temperature of about 30° C. or any other suitable temperature as described, for example in FIG. 3 above, and flowing through HTA 124 for cooling drying unit 222. Subsequently, pressurized air 101 is directed out of drying unit 222, through an opening 195, toward blanket 44, so as to reduce the temperature of blanket 44 as described for dryer 66 in FIG. 3 above, and pumped away from blanket 44, via air outlet passage 130, toward AOC 123, using the same technique described in FIG. 3 above.

Note that in this configuration, pressurized air 101 outflows from the center of drying unit 222 toward blanket 44, and is pumped away from blanket 44 through air outlet passages 130 located at the sides of drying unit 222.

In the example of FIG. 4, main dryer 64 comprises nine drying units 222 and two halves of drying unit 222 at the ends of main dryer 64. In this configuration, main dryer 64 comprises ten air outlet passages 130, which improves the extraction of pressurized air 101 compared to a set of ten full-sized drying units 222 (not shown) having a total number of nine air outlet passages 130.

In some embodiments, processor 20 and/or controller 54 are configured to receive temperature signal from one or more of temperature sensors 92A-92E, and based on the temperature signal to control at least one of (a) the intensity of the optical radiation applied to blanket 44 by one or more light sources, such as sources 111, and (b) the flow rate of pressurized air 101, or any other suitable gas, directed to surface 106 of blanket 44.

In the present example, processor 20 and/or controller 54 are configured to control the IR light intensity and the flow rate of pressurized air 101 based on multiple temperature signals received from multiple temperature sensors disposed along blanket 44. As described above, blanket 44 is typically cooled by the temperature of the surrounding environment. For example, the temperature of the surrounding air and of rollers 78 may be substantially smaller than 100° C. (e.g., at any temperature between about 25° C. and 100° C.).

In some embodiments, white dryer 97 and bottom dryer 75 of system 110 may comprise, each, five drying units 222, arranged in a configuration similar to that of main dryer 64, or using any other suitable configuration. In an embodiment, blanket pre-heater 98 may comprise a single drying unit 222, or one dryer 66, or one or more sources 111 without an apparatus for flowing pressurized air 111.

In some embodiments, the structure of drying units 222 prevents mixture of pressurized air 101 incoming from AIC 122 with pressurized air 101 flowing through opening 195 into surface 106. As described above, after flowing through opening 195, pressurized air 101 is forced to flow, via air outlet passage 130 located between adjacent units 222, into AOC 123. In other words, after flowing through opening 195, the pressurized air that may contain residues of ink is not mixing with the incoming air flowing within drying unit 222.

The configurations of main dryer 64, white dryer 97, bottom dryer 75, drying units 222, and air outlet passages 130 are provided by way of example. In other embodiments, at least one of these dryers and units may have any other suitable configuration. For example, rather than having central AIC 122 and AOC 123 and controlling the flow rate of pressurized air 101 using valves (not shown), system 10 and/or system 110 may comprise multiple AICs 122 and/or AOCs 123 coupled to one or more of the dryers described above.

Controlling the Ink Drying Process

Figure 5:
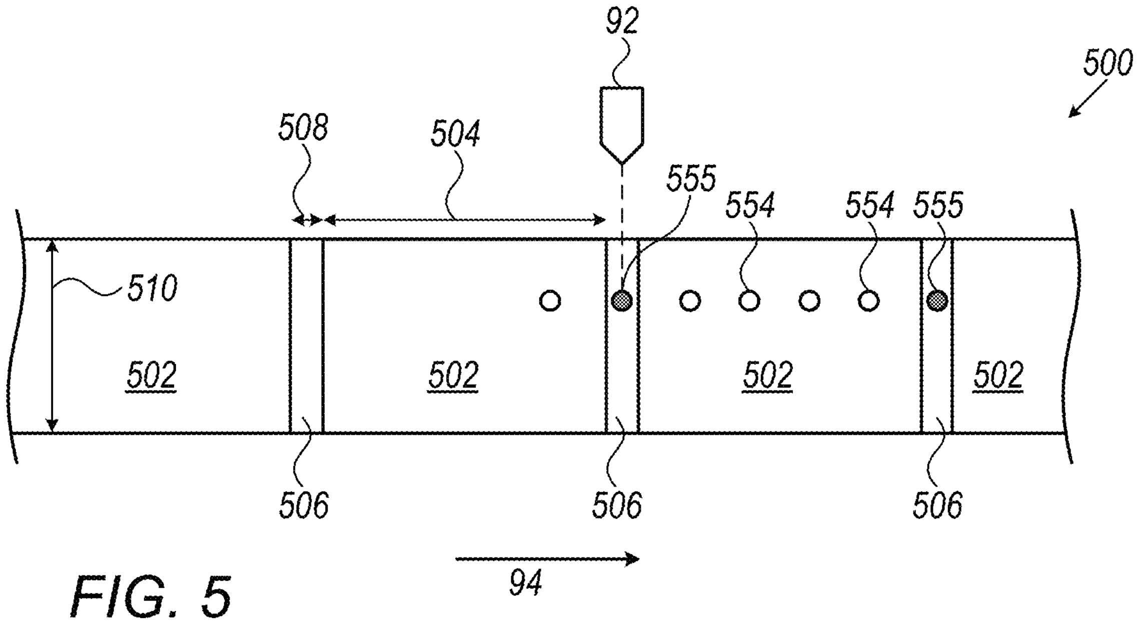
FIG. 5 is a schematic pictorial illustration of a blanket used in a digital printing system, in accordance with an embodiment of the present invention.

FIG. 5 is a schematic pictorial illustration of a blanket 500 used in a digital printing system, in accordance with an embodiment of the present invention. Blanket 500 may replace, for example, blanket 44 of systems 10 and 110 shown in FIGS. 1-4 above.

In some embodiments, blanket 500 is moved in the moving direction represented by arrow 94, and comprises sections 502 having the ink image printed thereon and sections 506, located between adjacent sections 502 and not receiving the ink droplets from print bars 61 and 62 described above.

In some embodiments, blanket 500 has a width 510 of about 1040 mm-1050 mm, section 502 has a length 504 of about 750 mm, and section 506 has a length 508 of about 750 mm.

In some embodiments, sources 111 are typically laid out along width 510 and at least some of sources 111 have a width of about 1120 mm that allows uniform heating along the entire width of blanket 500. In such embodiments, processor 20 and/or controller 54 are configured to control the movement of blanket 500, in the direction of arrow 94, at a predefined speed (e.g., about 1.7 meters per second) that maintains the uniform heating of the entire area of blanket 500.

In some embodiments, processor 20 and/or controller 54 are configured to control temperature sensors 92 (e.g., temperature sensors 92A-92E) to measure the temperature of blanket 500 at a predefined frequency, in the present example about every 20 milliseconds. In such embodiments, at a moving speed of 1.7 meters per second, each temperature sensor 92 measures the temperature of blanket 500 at a frequency of about every 34 mm.

In some embodiments, processor 20 and/or controller 54 are configured to receive temperature signals 554 and 555 indicative of the temperature measured (e.g., by temperature sensors 92) at sections 502 and 506 of blanket 500, respectively. As described in FIG. 2 above, the blanket temperature depends, inter-alia, on the coverage level, which is the amount of ink applied to the blanket surface.

In the example of blanket 500, the coverage level in section 502 may vary in accordance with the pattern of the ink image, whereas section 506, which does not receive ink from print bars 61 and 62, is expected to have a uniform temperature. Note that due to the latent heat of the ink disposed on section 502, at least some of the energy of beams 99 is absorbed by the ink and is less effective for the direct heating of blanket 500.

In some embodiments, when processor 20 and/or controller 54 receive temperature signals 554 and 555 from one or more of temperature sensors 92 (e.g., selected from among temperature sensors 92A-92E), the temperature measured at section 506 is typically higher than the temperature measured at section 502.

In some embodiments, processor 20 and/or controller 54 are configured to determine, based on temperature signals 554 and 555, the highest temperature of blanket 500, using any suitable analysis. For example, processor 20 and/or controller 54 may store a predefined amount (e.g., about 100) of the latest temperature signals 554 and 555. Subsequently, processor 20 and/or controller 54 may select, from among the stored signals, the temperature signals indicative of the top three highest temperatures, and may determine the highest temperature of blanket 500 by calculating a median of the top three highest temperatures.

In other embodiments, processor 20 and/or controller 54 may determine the highest temperature of blanket 500 using any suitable analysis of temperature signals 554 and 555.

In alternative embodiments, processor 20 and/or controller 54 are configured to control temperature one or more of temperature sensors 92A-92E, to measure the temperature of blanket 500 using any other suitable sampling frequency.

In some embodiments, based on the calculated highest temperature of blanket 500, processor 20 and/or controller 54 are configured to control the intensity of IR radiation emitted from sources 111, and the flow rate of pressurized air 101.

In such embodiments, in response to calculating a highest temperature of about 140° C., processor 20 and/or controller 54 are configured to reduce the intensity of beams 99 and/or to increase the flow rate of pressurized air 101.

In some embodiments, processor 20 and/or controller 54 are configured to calculate the temperature along different sections of blanket 500, based on any suitable sampling amount of temperature signals 554 and 555.

In some embodiments, processor 20 and/or controller 54 are configured to hold thresholds indicative of the highest and lowest specified temperatures of the printing process, and to maintain the temperature of blanket 500 by controlling at least some of the dryers described above (e.g., main dryer 64 and bottom dryer 75).

For example, in response to sensing and calculating after main dryer 64, a temperature level lower than the lowest specified temperature, processor 20 and/or controller 54 are configured to control bottom dryer 75 to increase the intensity of beams 99 and/or to reduce the flow rate of pressurized air 101.

As described above, in addition to the flow rate of pressurized air 101, the blanket is typically cooled by the surrounding environment that have physical contact with the blanket. For example, the temperature of the air (or other gas) surrounding the blanket, and the temperature of rollers 78, may be substantially smaller than 100° C. (e.g., at any temperature between about 25° C. and 100° C.).

In some embodiments, processor 20 may receive position signals indicative of the positions of respective markers or other reference points of the blanket, as described in FIG. 1 above. Based on the position signals, processor 20 and/or controller 54 are configured to adjust the intensity of beams 99 and/or the flow rate of pressurized air 101, at one or more of the dryers described above.

For example, when blanket is moved in system 10, processor 20 may associate first specific markers of blanket 500 with sections 502, and second specific markers of blanket 500 with sections 506. In an embodiment, when the first specific markers are passing in close proximity to a given source 111 of main dryer 64, processor 20 may control main dryer 64 to increase the intensity of beams 99 directed from given source 111 to blanket 500.

Similarly, when the second specific markers are passing in close proximity to given source 111 of main dryer 64, processor 20 may control main dryer 64 to reduce the intensity of beams 99 emitted from given source 111.

In some embodiments, processor 20 and/or controller 54 are configured to set, e.g., in dryers 62, a constant intensity of beams 99 and a constant flow rate of pressurized air 101. In such embodiments, a first set of ink droplets disposed at a given position on the blanket surface will partially dry so that a second set of ink droplets applied to the given position later by other print bars will be mixed with the first set of ink droplets so as to produce a specified mixed color at the given location of the blanket.

In some embodiments, processor 20 and/or controller 54 are configured to control the temperature of pressurized air 101 applied to the blanket (e.g., blanket 44 or blanket 500). For example, the specified temperature of pressurized air 101 may be about 30° C. Systems 10 and 110 may operate at various countries and seasons having a broad range of environmental temperatures, For example, the environmental temperature may range between about 45° C. in the summer at warm countries and about −30° C. in the winter at cold countries.

In some embodiments, at an environmental temperature lower than 30° C., systems 10 and 110 are configured to filter ink byproducts from the hot air extracted from surface 106 of blanket 44 by AOC 123. In such embodiments, processor 20 and/or controller 54 are configured to control AIC 122 to mix between the hot filtered air and the air of the environment so as to have air at about 30° C. pressurized and applied to blanket 44.

In some embodiments, at an environmental temperature higher than 30° C., processor 20 and/or controller 54 are configured to control AIC 122 to mix between the hot air of the environment and air cooled (e.g., using an air conditioning system or any other technique) by a print shop using system 10 or 110 so as to have air at about 30° C., and to pressurize and apply the mixed air to blanket 44.

In some embodiments, systems 10 and 110 comprise a current sensor (not shown) coupled to an electrical cable (not shown) supplying electrical current to source 111. The current sensor is configured to sense the inductance level on the electrical cable. In such embodiments, processor 20 and/or controller 54 are configured to receive from the current sensor a signal indicative of the electrical current flowing through the electrical cable and to determine whether or not the respective source 111 is functional.

Figure 6:
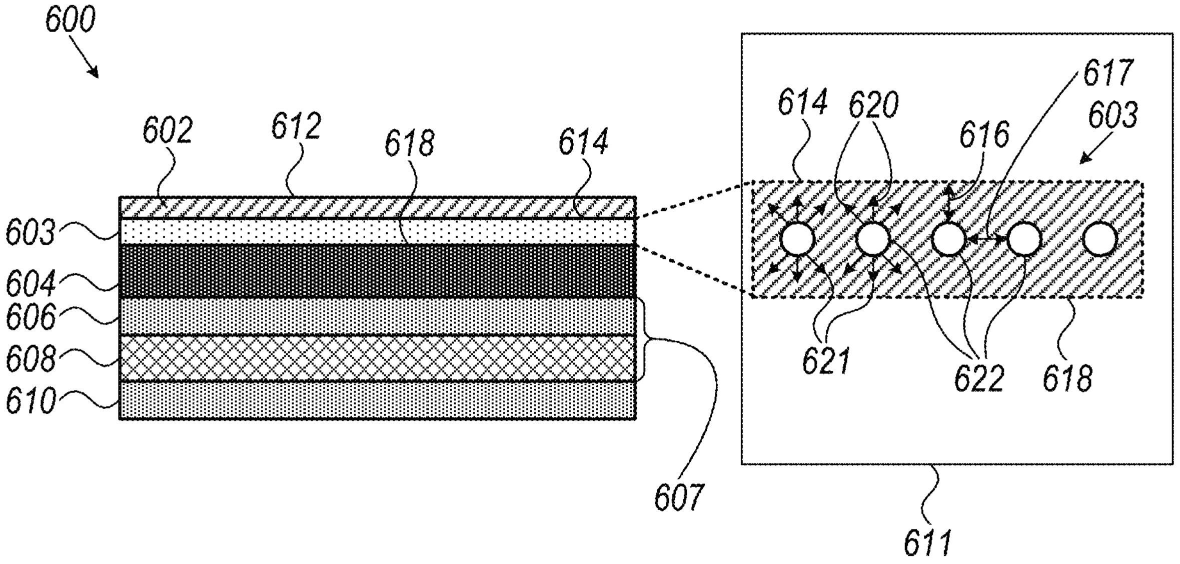
FIG. 6 is a diagram that schematically illustrates a sectional view of a process sequence for producing a blanket used in a digital printing system, in accordance with an embodiment of the present invention.

Blanket Structure and a Process Sequence for Producing Blanket Adapted for IR-Based Drying of Ink FIG. 6 is a diagram that schematically illustrates a sectional view of a process sequence for producing a blanket 600, in accordance with an embodiment of the present invention. Blanket 600 may replace, for example, blanket 44 of any of systems 10 and 110 and features thereof shown and described in FIGS. 1-5 above.

The process begins with preparing on a carrier (not shown), an exemplary stack of six layers comprising blanket 600.

In some embodiments, the carrier may be formed of a flexible foil, such as a flexible foil comprising aluminum, nickel, and/or chromium. In an embodiment, the foil comprises a sheet of aluminized polyethylene terephthalate (PET), also referred to herein as a polyester, e.g., PET coated with fumed aluminum metal.

In some embodiments, the carrier may be formed of an antistatic polymeric film, for example, a polyester film. The properties of the antistatic film may be obtained using various techniques, such as addition of various additives, e.g., an ammonium salt, to the polymeric composition.

In some embodiments, the carrier has a polished flat surface (not shown) having a roughness (Ra) on an order of 50 nm or less, also referred to herein as a carrier contact surface.

In some embodiments, a fluid first curable composition (not shown) is provided and a release layer 602 is formed therefrom on the carrier contact surface. In some embodiments, release layer 602 comprises an ink reception surface 612 configured to receive the ink image, e.g., from image forming station 60, and to transfer the ink image to a target substrate, such as sheet 50, shown and described in FIG. 1 above. Note that layer 602, and particularly surface 612 are configured to have low release force to the ink image, measured by a wetting angle, also referred to herein as a receding contact angle (RCA), between surface 612 and the ink image, as will be described below.

The low release force enables complete transfer of the ink image from surface 612 to sheet 50. In some embodiments, release layer 602 may comprise a transparent silicon elastomer, such as a vinyl-terminated polydimethylsiloxane (PDMS), or from any other suitable type of a silicone polymer, and may have an exemplary thickness of about 10 μm-15 μm, or any other suitable thickness larger than about 10 μm.

In some embodiments, the fluid first curable material comprises a vinyl-functional silicone polymer, e.g., a vinyl-silicone polymer comprising at least one lateral vinyl group in addition to the terminal vinyl groups, for example, a vinyl-functional polydimethyl siloxane.

In some embodiments, the fluid first curable material may comprise a vinyl-terminated polydimethylsiloxane, a vinyl-functional polydimethylsiloxane comprising at least one lateral vinyl group on the polysiloxane chain in addition to the terminal vinyl groups, a crosslinker, and an addition-cure catalyst, and optionally further comprises a cure retardant.

In the example of FIG. 6, release layer 602 may be uniformly applied to the PET-based carrier, leveled to a thickness of 5-200 μm, and cured for approximately 2-10 minutes at 120-130° C. Note that the hydrophobicity of ink transfer surface 612 may have a RCA of about 60°, with a 0.5-5 microliter (μl) droplet of distilled water. In some embodiments, a surface of release layer 602 (that in contact with a surface 614 that will be described below) may have a RCA that is significantly higher, typically around 90°.

In some embodiments, PET carriers used to produce ink-transfer surface 612 may have a typical RCA of 40° or less. All contact angle measurements were carried out using a Contact Angle analyzer "Easy Drop" FM40Mk2 produced by Krüss™ Gmbh, Borsteler Chaussee 85, 22453 Hamburg, Germany and/or using a Dataphysics OCA15 Pro, produced by Particle and Surface Sciences Pty. Ltd., Gosford, NSW, Australia.

In some embodiments, blanket 600 comprises an IR layer 603 having an exemplary thickness range of about 30 μm-150 μm, and configured to absorb the entire IR radiation of beam 99 or a significant portion thereof. In the present example, IR layer 603 is adapted to absorb, within the top 5μ thereof, about 50% of the IR radiation of beam 99. In other words, IR layer 603 is substantially opaque to beam 99.

Reference is now made to an inset 611 showing a sectional view of IR layer 603. In some embodiments, IR layer 603 is applied to release layer 602 and has surface 612 interfacing therewith, and a surface 618 interfacing with a compliance layer 604 described in detail below.

In some embodiments, IR layer 603 comprises a matrix made from silicone (e.g., PDMS) and multiple particles 622 disposed at given locations within the bulk of the PDMS matrix of layer 603. In some embodiments, particles 622 comprise a suitable type of pigment, such as but not limited to off-the-shelf carbon black (CB) particles, each of which having a typical diameter range between about 10 μm (for IR layer 603 thickness of about 30 μm) and 30 μm (for IR layer 603 thickness of about 50 μm).

In some embodiments, particles 622 are embedded at the bulk of IR layer 603, within a distance 616 of about 10 μm or 20 μm from surface 614. Particles 622 are also arranged uniformly along layer 603 at a distance 617 of about 0.1 μm-5 μm from one another. In other embodiments, distances 616 and 617 may be altered between different blankets, for example, at least one particle may be in close proximity or in contact with any of surfaces 614 or 618. Similarly, distance 617 may vary along IR layer 603.

In some embodiments, having particles 622 embedded within the bulk of IR layer 603, rather than at surface 614, may improve the adhesive force between IR layer 603 and release layer 602. Similarly, having particles 622 embedded within the bulk of IR layer 603 may improve the adhesive force between IR layer 603 and compliance layer 604.

In some embodiments, after coating and curing the release formulation on the PET, IR layer 603, having the CB particles, is coated on the cured release layer and also cured. Note that the insertion of the CB particles, or any other suitable type of particles into IR layer 603, may be carried out by mixing the particles in the matrix of the IR layer before applying the layer to the release layer, or by disposing the particles after applying the IR layer to the release layer, or using any other suitable technique. Subsequently, PDMS layer is coated on top of the cured IR layer, and fiber glass layer is applied and all structure is cured. Finally, silicone resin is coated on fiber glass fabric and cured.

In other embodiments, the CB particles and the position thereof may affect the drying process of the ink applied to surface 612 of release layer 602, as will be described in detail below.

Reference is now made back to the general view of blanket 600. In some embodiments, blanket 600 comprises compliance layer 604, also referred to herein as a conformal layer, typically made from PDMS and may comprise a black pigment additive. Compliance layer 604 is applied to IR layer 603 and may have a typical thickness of about 150 μm or any other suitable thickness equal to or larger than about 100 μm.

In some embodiments, compliance layer 604 may have mechanical properties (e.g., greater resistance to tension) that differ, for example, from release layer 602 and IR layer 603. Such desired differences in properties may be obtained, e.g., by utilizing a different composition with respect to release layer 602 and/or IR layer 603, by varying the proportions between the ingredients used to prepare the formulation of release layer 602 and/or IR layer 603, and/or by the addition of further ingredients to such formulation, and/or by the selection of different curing conditions. For example, adding filler particles may increase the mechanical strength of compliance layer 604 relative to release layer 602 and/or IR layer 603.

In some embodiments, compliance layer 604 has elastic properties that allows release layer 602 and surface 612 to follow closely the surface contour of a substrate onto which an ink image is impressed (e.g., sheet 50). The attachment of compliance layer 602 to the side opposite to ink-transfer surface 612 may involve the application of an adhesive or bonding composition in addition to the material of compliance layer 602.

In some embodiments, blanket 600 comprises reinforcement stacked layers, also referred to herein as a support layer 607 or a skeleton of blanket 600, which is applied to compliance layer 604 and is described in detail below. In some embodiments, support layer 607 is configured to provide blanket 600 with an improved mechanical resistance to deformation or tearing that may be caused by the torque applied to blanket 600, e.g., by rollers 78 and dancer assembly 74. In some embodiments, the skeleton of blanket 600 comprises an adhesion layer 606, made from PDMS or any other suitable material, which is formed together with a woven fiberglass layer 608. In some embodiments, layers 606 and 608 may have typical thickness of about 150 μm and about 112 μm, respectively, or any other suitable thickness, such that the thickness of support layer 607 is typically about 200 μm.

In other embodiments, the skeleton may be produced using any other suitable process, e.g., by disposing layer 606 and subsequently coupling layer 608 thereto and polymerizing, or by using any other process sequence.

In some embodiments, the polymerization process may be based on hydrosilylation reaction catalyzed by platinum catalyzed, commercially known as “addition cure.”

In other embodiment, the skeleton of blanket 600 may comprise any suitable fiber reinforcement, in the form of a web or a fabric, to provide blanket 600 with sufficient structural integrity to withstand stretching when blanket 600 is held in tension, e.g., in system 10. The skeleton may be formed by coating the fiber reinforcement with any suitable resin that is subsequently cured and remains flexible after curing.

In an alternative embodiment, support layer 607 may be separately formed, such that fibers embedded and/or impregnated within an independently cured resin. In this embodiment, support layer 607 may be attached to compliance layer 604 via an adhesive layer, optionally eliminating the need to cure support layer 607 in situ. In this embodiment, support layer 607, whether formed in situ on compliance layer 604 or separately, may have a thickness of between about 100 μm and about 500 μm, part of which is attributed to the thickness of the fibers or the fabric, which thickness generally varies between about 50 μm and 300 μm. Note that thickness of support layer 607 is not limited to the above values.

In some embodiments, blanket 600 comprises a high-friction layer 610, also referred to herein as a grip layer, made from a typically transparent PDMS and configured to make physical contact between blanket 600 and the rollers and dancers of system 10 and 110 described, respectively, in FIGS. 1 and 2 above. Note that although layer 610 is made from relatively soft materials, the surface facing the rollers has high friction so that blanket 600 will withstand the torque applied by the rollers and dancers without sliding. In an example embodiment, layer 610 may have a thickness of about 100 μm, but may alternatively have any other suitable thickness, e.g., between 10 μm and 1 mm.

Additional embodiments that implement the production of layers 602, 604, 606, 608 and 610 of blanket 600 are described in detail, for example, in PCT International Publication WO 2017/208144, whose disclosure is incorporated herein by reference.

Reference is now made back to inset 611. As described, for example, in FIGS. 1, 3 and 4 above, print bars 62 of image forming station 60 apply the ink droplets to surface 106 of blanket 44. In the example of blanket 600 shown in FIG. 6, print bars 62 of image forming station 60 apply the ink droplets to surface 612 of release layer 602.

In some embodiments, the CB content of particles 622 is configured to absorb the IR radiation of beams 99 passing through release layer 602. In response to the IR radiation of beams 99, particles 622 are configured to have a temperature larger than the temperature of the silicone matrix of IR layer 603. In other words, the CB particles absorb the IR radiation and emit heat waves 620 and 621 across IR layer 603. In such embodiments, heat waves 620 and 621 are increasing the temperature of layers 602 and 604, respectively.

In some embodiments, the silicone matrix of IR layer 603 has low thermal conductivity so that heat waves 620 are progressing within IR layer 603 and are forming a uniform increased temperature across IR layer 603 and release layer 602.

Additionally or alternatively, the CB particles may be embedded in release layer 602.

In some embodiments, by having release layer 602 (which is transparent to IR radiation) on top of IR layer 603 (which is configured to absorb the IR radiation) is capturing heat waves 620 and 621 within blanket 600 and is, thereby, expediting the drying process of the ink droplets applied to surface 612.

In such embodiments, the heat produced by heat waves 620 may accumulate between and within layers 602 and 603 and the low thermal conductivity of these layers allowing the heat to be distributed uniformly across surface 612 of blanket 600.

Based on the above-description of blanket 600, the total thickness between particle 622 and the outer surface of layer 610 is about 0.5 mm, whereas the distance between particle 622 and surface 612 is about 20 μm or 30 μm. As shown in FIG. 6, heat waves 621 appear shorter than heat waves 620, so as to show that most of the heat produced by the CB particles is dissipating toward surface 612. In such embodiments, most of the heat produced by the CB particles is used for drying the ink droplets applied to surface 612 of blanket 600.

Figure 7:
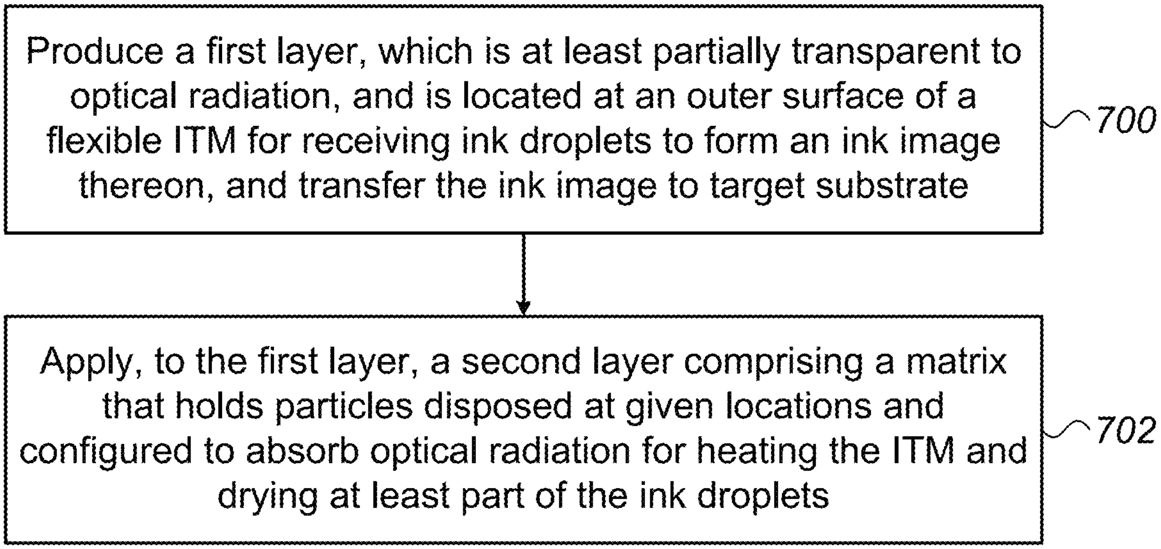
FIG. 7 is a flow chart that schematically illustrates a method for producing a blanket of a digital printing system, in accordance with an embodiment of the present invention.

FIG. 7 is a flow chart that schematically illustrates a method for producing blanket 600, in accordance with an embodiment of the present invention. The method begins at a first layer production step 700 with producing release layer 602 formed on the PET-based carrier contact surface as described in FIG. 6 above. In some embodiments, release layer 602 comprises an ink reception surface 612 configured to receive the ink image, e.g., from image forming station 60, and to transfer the ink image to a target substrate, such as sheet 50, shown and described in FIG. 1 above. In some embodiments, release layer 602 is at least partially transparent to beam 99 of the IR radiation and is located at the outer surface of blanket 600, as shown and described in detail in FIG. 6 above.

At a second layer applying step 702, IR layer 603 is applied to release layer 602. In some embodiments, IR layer 603 comprises the matrix made from silicone (e.g., PDMS). The matrix holds multiple particles 622 (e.g., carbon black particles) disposed at given locations within the bulk of the PDMS matrix of layer 603, and configured to absorb optical radiation (in the present example IR radiation of beam 99) for heating release layer 602 and drying at least part of the ink droplets applied to ink reception surface 612. Step 702 concludes the method of FIG. 7, however, additional steps for producing blanket 600 are described in detail in FIG. 6 above.

Figure 8:
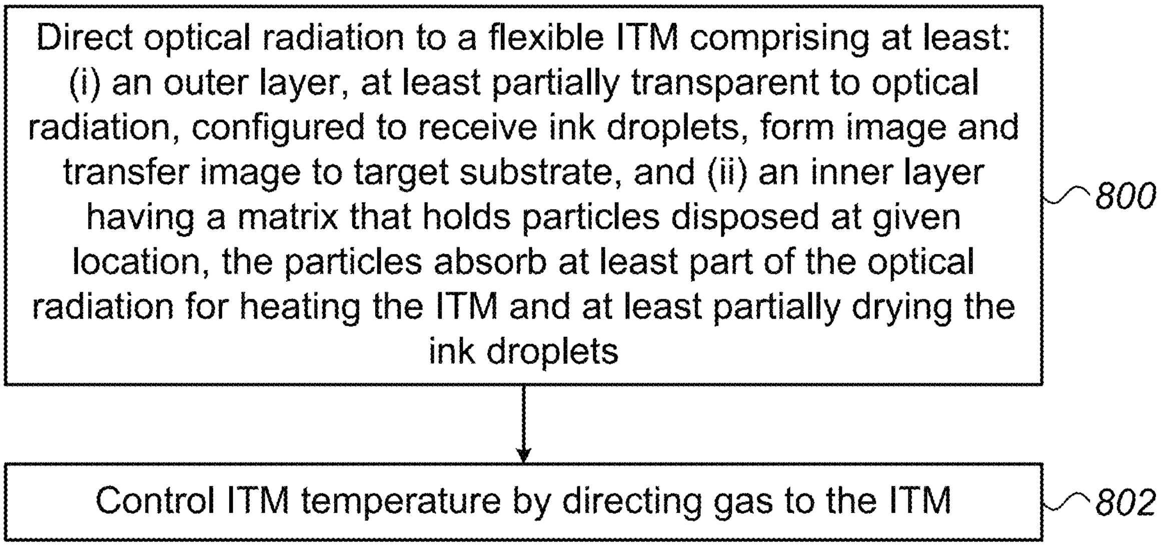
FIG. 8 is a flow chart that schematically illustrates a method for drying ink and controlling the temperature of a blanket during a digital printing process, in accordance with an embodiment of the present invention.

FIG. 8 is a flow chart that schematically illustrates a method for drying ink and controlling the temperature of a blanket during a digital printing process, in accordance with an embodiment of the present invention.

In the context of the present disclosure and in the claims, the term "blanket" refers to blanket 44 of FIGS. 1-4, to blanket 500 of FIG. 5, to blanket 600 of FIG. 6, and to any other sort of suitable ITM. Embodiments of the method of FIG. 8 are described using blanket 600, but are applicable for all the types of blankets and ITMs described above, and for other suitable types of ITMs.

The method begins at an optical radiation direction step 800, with directing IR radiation, such as beam 99, to surface 612 of release layer 602, which is at least partially transparent to the optical radiation, and is configured to: (i) receive the ink droplets, (ii) form the image thereon, and (iii) transfer the image to target substrate, such as sheet 50 or web 51. In some embodiments, at least some of the IR radiation of beam 99 is absorbed by particles 622 (e.g., carbon black particles) disposed at given locations within the bulk of the PDMS matrix of layer 603.

In some embodiments, when absorbed by particles 622, the IR radiation heats release layer 602 and at least partially dries the ink droplets of the ink image formed on the surface of the release layer.

At a blanket temperature controlling step 802 that concludes the method, processor 20 controls the temperature control assembly to direct gas (in the present example, pressurized air) at a predefined flow rate for controlling the temperature of the blanket, e.g., to about 70° C. or 80° C. as described in FIGS. 1 and 2 above.

For example, as described on FIGS. 2 and 3 above, dryer 66 comprises one or more openings to AIC 122, having the air blower and configured to supply pressurized air 101 (or any other type of suitable gas) into dryer 66. In some embodiments, dryer 66 further comprises one or more openings to AOC 123, having the air extraction apparatus (e.g., a suitable type of vacuum or negative pressure pump) configured to draw pressurized air 101 after cooling the blanket.

Although the embodiments described herein mainly address drying of an intermediate transfer member in a digital printing system, the methods and systems described herein can also be used in other applications, such as in drying liquid from any substrate, or in other applications, such as but not limited to heating or annealing or curing of any substrate.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:

an image forming station comprising multiple print bars arranged along an axis and configured to apply to a substrate being moved along the axis, droplets of printing fluids having multiple colors, respectively; and multiple dryers, which are mounted on the image forming station, and are interleaved with the multiple print bars along the axis, the multiple dryers are configured to dry the droplets applied to the substrate for forming an image on the substrate, wherein at least a dryer among the dryers comprises:

an illumination assembly, which is configured to dry the droplets by directing the optical radiation to impinge on the substrate; and a temperature control assembly, which is configured to control a temperature of the substrate by directing a gas to the substrate, wherein the illumination assembly and the temperature control assembly are packaged together in a housing, wherein the substrate comprises a flexible intermediate transfer member (ITM) comprising a stack of at least (i) a first layer, located at an outer surface of the ITM and configured to receive the droplets from the image forming system, and to transfer the image to a target substrate, and (ii) a second layer comprising a matrix that holds particles at respective given locations, wherein the second layer is configured to receive the optical radiation passing through the first layer, and wherein the particles are configured to heat the ITM by absorbing at least part of the optical radiation.

2. The system according to claim 1, wherein the illumination assembly comprises one or more light sources disposed at one or more respective predefined locations relative to the substrate.

3. The system according to claim 2, wherein the illumination assembly comprises at least an array comprising a plurality of the light sources.

4. The system according to claim 3, wherein the array comprises the plurality of the light sources arranged along the axis.

5. The system according to claim 3, wherein the array comprises one or more pairs of light sources configured to direct the optical radiation to impinge on the substrate, and wherein the optical radiation comprises infrared (IR) radiation.

6. The system according to claim 5, wherein the housing has at least a cavity facing the substrate and wherein at least a pair of light sources among the pairs of light sources is arranged within the cavity.

7. The system according to claim 6, and comprising a reflector, which is coupled between the cavity and the pair of light sources, and is configured to receive a first portion of the IR radiation emitted from the pair of light source, and to reflect a second portion of the IR radiation, which is smaller than the first portion, toward the substrate.

8. The system according to claim 7, wherein at least part of a third portion of the IR radiation, which is a difference between the first and second portion of the IR radiation, is absorbed in the reflector and generates a heat, and comprising a heat transfer assembly (HTA), which is arranged around the reflector, and is configured to dissipate at least part of the heat generated in the reflector.

9. The system according to claim 8, wherein the HTA comprises one or both ribs and traces configured to conduct the heat generated in the reflector.

10. The system according to claim 8, wherein the temperature control assembly comprises at least an air inlet channel (AIC) configured to supply the gas into the dryer for directing the gas to a surface of the substrate for cooling the substrate, and at least an air outlet channel (AOC) configured to draw the gas away from the surface and out of the dryer.

11. The system according to claim 10, wherein the gas comprises a pressurized air, wherein the AIC comprises an air blower, which is configured to supply the pressurized air into the dryer, and to flow the pressurized air along a first flowing path within the dryer.

12. The system according to claim 11, wherein the AOC comprises an air extraction apparatus, which is configured to draw the pressurized air: (i) away from the substrate within the dryer along a second flowing path different from the first flowing path, and (ii) out of the dryer.

13. The system according to claim 12, wherein the air extraction apparatus comprises a vacuum pump.

14. The system according to claim 12, and comprising a first opening between the housing and a first side of the HTA, and a second opening at a second side of the HTA opposite the first side, wherein the first flowing path passes through the first opening, and the second flowing path passes through the second opening.

15. The system according to claim 12, wherein the array comprises an additional pair of light sources, an additional reflector, and an additional HTA, which are positioned between (i) the second opening and (ii) a third opening between the housing and the additional HTA, wherein the AIC is configured to flow an additional pressurized air along a third flowing path through the third opening toward the substrate for cooling the additional HTA, and wherein the AOC is configured to draw the additional pressurized air along the second flowing path.

16. The system according to claim 15, wherein the pair of light sources and the additional pair of light sources are arranged along the axis, and are positioned at an equal distance from the substrate.

17. The system according to claim 1, wherein the first and second layers are adjacent to one another, and wherein the particles are arranged at a predefined distance from one another so as to heat the outer surface uniformly.

18. The system according to claim 1, wherein the particles are embedded within a bulk of the second layer at a given distance from the outer surface so as to heat the outer surface uniformly.

19. A system, comprising:

an image forming station comprising multiple print bars arranged along an axis and configured to apply to a substrate being moved along the axis, droplets of printing fluids having multiple colors, respectively; and multiple dryers, which are mounted on the image forming station, and are interleaved with the multiple print bars along the axis, the multiple dryers are configured to dry the droplets applied to the substrate for forming an image on the substrate, wherein at least a dryer among the dryers comprises:

an illumination assembly, which is configured to dry the droplets by directing the optical radiation to impinge on the substrate; and a temperature control assembly, which is configured to control a temperature of the substrate by directing a gas to the substrate, wherein the illumination assembly and the temperature control assembly are packaged together in a housing, and wherein the substrate comprises a flexible intermediate transfer member (ITM) comprising a stack of at least (i) a first layer, located at an outer surface of the ITM and configured to receive the droplets from the image forming system, and to transfer the image to a target substrate, and (ii) a second layer comprising a matrix that holds particles at respective given locations, wherein the second layer is configured to receive the optical radiation passing through the first layer, and wherein the particles are configured to heat the ITM by absorbing at least part of the optical radiation, and a processor, which is configured to receive a temperature signal indicative of a temperature of the substrate, and, based on the temperature signal, to control at least one of (i) an intensity of the optical radiation, and (ii) a flow rate of the gas.

* * * * *